United States Patent
Tanaka

(10) Patent No.: US 12,238,582 B2
(45) Date of Patent: Feb. 25, 2025

(54) COMMUNICATION DEVICE AND COMMUNICATION METHOD

(71) Applicant: SONY GROUP CORPORATION, Tokyo (JP)

(72) Inventor: Yusuke Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 454 days.

(21) Appl. No.: 17/603,764

(22) PCT Filed: Feb. 27, 2020

(86) PCT No.: PCT/JP2020/008112
§ 371 (c)(1),
(2) Date: Oct. 14, 2021

(87) PCT Pub. No.: WO2020/217704
PCT Pub. Date: Oct. 29, 2020

(65) Prior Publication Data
US 2022/0182884 A1    Jun. 9, 2022

(30) Foreign Application Priority Data
Apr. 23, 2019    (JP) .................. 2019-082358

(51) Int. Cl.
*H04W 28/14*    (2009.01)
*H04L 1/08*    (2006.01)
(Continued)

(52) U.S. Cl.
CPC ............... *H04W 28/14* (2013.01); *H04L 1/08* (2013.01); *H04W 28/04* (2013.01); *H04W 28/12* (2013.01)

(58) Field of Classification Search
CPC ........ H04L 1/08; H04W 28/04; H04W 28/12; H04W 28/14
See application file for complete search history.

(56) References Cited

U.S. PATENT DOCUMENTS 7,450,512 B1    11/2008  Young et al.
9,467,885 B2 *  10/2016  Tenny ................... H04W 24/10
(Continued)

FOREIGN PATENT DOCUMENTS

CN    103535062 A    1/2014
EP    2124471 A1    11/2009
(Continued)

OTHER PUBLICATIONS

Partial Supplementary European Search Report of EP Application No. 20794994.2, issued on May 16, 2022, 11 pages.
(Continued)

*Primary Examiner* — Melanie Jagannathan
(74) *Attorney, Agent, or Firm* — CHIP LAW GROUP

(57) ABSTRACT

There is provided a communication device that transmits a wireless signal using a plurality of bands.
The communication device that transmits data in a plurality of bands includes: a first queue for each band that stores data to be transmitted in each band; a second queue common to at least two bands of the plurality of bands, the second queue storing data to be transmitted with high priority; and a control unit that controls transmission of the data stored in the first queue and the second queue. The communication device transmits information regarding the first queue and the second queue. The second queue stores the retransmission data together with information regarding a band of first transmission.

18 Claims, 27 Drawing Sheets

(51) Int. Cl.
H04W 28/04 (2009.01)
H04W 28/12 (2009.01)

(56) References Cited

U.S. PATENT DOCUMENTS

| | | | |
|---|---|---|---|
| 9,538,535 B2* | 1/2017 | Huang | H04W 72/0453 |
| 10,499,329 B2* | 12/2019 | Dangy-Caye | H04W 76/28 |
| 2005/0289256 A1* | 12/2005 | Cudak | H04L 1/0009 |
| | | | 710/62 |
| 2008/0049773 A1 | 2/2008 | Utsunomiya et al. | |
| 2008/0320354 A1* | 12/2008 | Doppler | H04L 1/1893 |
| | | | 714/748 |
| 2010/0150113 A1* | 6/2010 | Hwang | H04W 72/54 |
| | | | 370/336 |
| 2010/0315954 A1* | 12/2010 | Singh | H04W 72/044 |
| | | | 370/329 |
| 2012/0002678 A1* | 1/2012 | Jonsson | H04L 47/6275 |
| | | | 370/412 |
| 2013/0090071 A1 | 4/2013 | Abraham et al. | |
| 2014/0269468 A1* | 9/2014 | Jia | H04W 36/06 |
| | | | 370/329 |
| 2015/0071239 A1* | 3/2015 | Zhang | H04W 72/56 |
| | | | 370/329 |
| 2015/0282005 A1* | 10/2015 | Du | H04W 28/065 |
| | | | 370/394 |
| 2015/0312891 A1* | 10/2015 | Quinn | H04W 4/02 |
| | | | 455/452.1 |
| 2018/0183723 A1* | 6/2018 | Cariou | H04L 69/22 |
| 2018/0278697 A1 | 9/2018 | Cariou et al. | |
| 2020/0015047 A1* | 1/2020 | Song | H04W 4/026 |
| 2020/0214036 A1* | 7/2020 | Min | H04W 28/0278 |
| 2020/0266853 A1* | 8/2020 | Strobel | H04L 5/14 |
| 2020/0396520 A1* | 12/2020 | Hu | H04N 21/64738 |
| 2021/0329721 A1* | 10/2021 | Kim | H04W 76/15 |

FOREIGN PATENT DOCUMENTS

| | | |
|---|---|---|
| JP | 2008-053829 A | 3/2008 |
| JP | 2016-040945 A | 3/2016 |
| JP | 2018-157535 A | 10/2018 |
| WO | 2008/139319 A2 | 11/2008 |
| WO | 2012/138800 A1 | 10/2012 |
| WO | 2015/148180 A1 | 10/2015 |
| WO | WO-2017052803 A1 | 3/2017 |

OTHER PUBLICATIONS

International Search Report and Written Opinion of PCT Application No. PCT/JP2020/008112, issued on Apr. 7, 2020, 09 pages of ISRWO.

Naribole, et al., "MAC Architectures for EHT Multi-band Operation", IEEE 802.11/19/0360r0, Mar. 12, 2019, 08 pages.

* cited by examiner

FIG. 26

| 2601 | 2602 | 2603 | 2604 | 2605 | 2606 | 2607 | 2608 | 2609 |
|---|---|---|---|---|---|---|---|---|
| Queue Constitution | Band For Re Tx Info | Band For Tx Info | Band For BA Info | TID_INFO | Sequence Number Info | Data Priority Info | Retry Limit | Life Time |

COMMUNICATION DEVICE AND COMMUNICATION METHOD

CROSS REFERENCE TO RELATED APPLICATIONS

This application is a U.S. National Phase of International Patent Application No. PCT/JP2020/008112 filed on Feb. 27, 2020, which claims priority benefit of Japanese Patent Application No. JP 2019-082358 filed in the Japan Patent Office on Apr. 23, 2019. Each of the above-referenced applications is hereby incorporated herein by reference in its entirety.

TECHNICAL FIELD

The technology disclosed in this specification relates to a communication device and a communication method for transmitting and receiving wireless signals using a plurality of bands.

BACKGROUND ART

There is an increasing demand for wireless communication with a high transmission rate and high communication quality. For example, in order to realize a high transmission rate, a method of increasing a frequency band by, for example, using a plurality of frequency bands is known. On the other hand, with the spread of wireless communication apparatuses, communication failure due to interference of wireless networks has become a major problem. Usually, in wireless communication, a signal which a receiver fails to receive is retransmitted to ensure communication quality.

In communication using a plurality of bands, a configuration having a queue for holding data to be transmitted for each band is assumed. The queue is, for example, a storage area having a media access control (MAC) layer. For example, data generated in an upper layer is distributed to a queue of any band, and the same data is not held across a plurality of queues. Therefore, in a case where data of a queue of a certain band is transmitted, and retransmission needs to be performed due to communication failure, retransmission cannot be performed using another band or a plurality of bands. That is, it is not possible to improve the reliability of retransmission by, for example, performing retransmission while avoiding a band having poor communication characteristics in which communication fails or transmitting the same data in a plurality of bands to ensure redundancy.

For example, a wireless communication device has been proposed which controls a signal to interference plus noise ratio (SINR) on a reception side by distributing transmission data to an appropriate band and setting transmission power according to the band when performing communication using a plurality of bands (see Patent Document 1). Although the wireless communication device considers communication quality at the time of the first transmission, it is difficult to say that the wireless communication device considers securing communication quality at the time of retransmission and a queue configuration corresponding to a plurality of bands.

Furthermore, Non Patent Document 1 describes a case where an independent queue is equipped for each band and a case where a common queue is equipped for a plurality of bands as a MAC and a queue configuration when a plurality of bands is used. In the former case where an independent queue is equipped for each band, retransmission cannot be performed using another band or a plurality of bands, and thus reliability cannot be improved (the same as above). Furthermore, in the latter case where a common queue is equipped in a plurality of bands, data held on the reception side increases due to a difference in communication time for each band, and thus, there is a possibility that a necessary memory amount increases. For example, in a case where data with a small identification number takes a long time due to a low modulation and coding scheme (MCS) value or retransmission in one band, and a large number of pieces of data with a large identification number is transmitted in a short time with a high MCS value in another band, the reception side cannot transfer the data to an upper layer until data with a series of identification numbers is prepared, and needs to hold a large number of pieces of data.

CITATION LIST

Patent Document

Patent Document 1: Japanese Patent Application Laid-Open No. 2018-157535

Non Patent Document

Non Patent Document 1: IEEE 802.11/19/0360r0

SUMMARY OF THE INVENTION

Problems to be Solved by the Invention

An object of the technology disclosed in this specification is to provide a communication device and a communication method that transmit and receive a wireless signal using a plurality of bands by a queue configuration corresponding to the plurality of bands.

Solutions to Problems

The technology disclosed in this specification has been made in view of the above problems, and a first aspect thereof is
a communication device that transmits data in a plurality of bands, the device including:
a first queue for each band that stores data to be transmitted in each band;
a second queue common to at least two bands of the plurality of bands, the second queue storing data to be transmitted with high priority; and
a control unit that controls transmission of the data stored in the first queue and the second queue.

The second queue stores data requiring low delay and high reliability as data to be transmitted with high priority. Furthermore, the second queue stores retransmission data together with information regarding a band of first transmission. Then, the control unit performs control to add the information regarding the band of first transmission to the retransmission data output from the second queue and transmit the retransmission data.

Furthermore, the control unit adds information regarding an amount of the data stored in the second queue to the retransmission data output from the second queue and transmits the retransmission data. The information regarding the amount of data includes information regarding all the amounts of data stored in the second queue. Furthermore, the information regarding the amount of data includes information regarding the amount of data stored in a sub-queue in the second queue, the sub-queue corresponding to the data type of the retransmission data.

Furthermore, a second aspect of the technology disclosed in this specification is a communication method for transmitting data in a plurality of bands, the method including:

storing data to be transmitted in each band in a first queue for each band;

transmitting the data stored in the first queue;

storing data to be transmitted with high priority in a second queue common to at least two bands of the plurality of bands; and transmitting the data stored in the second queue.

Furthermore, a third aspect of the technology disclosed in this specification is a communication device that receives data in a plurality of bands, the device including:

an information reception unit that receives information regarding a first queue for each band and a second queue common to at least two bands of the plurality of bands; and a data reception unit that receives data added with information indicating an order and information indicating a band of first transmission in at least one band of the plurality of bands.

The communication device according to the third aspect further includes a data processing unit that rearranges each piece of the received data on the basis of the information indicating the order and the information indicating the band of first transmission. Furthermore, the communication device according to the third aspect further includes a transmission unit that transmits a reception result of the data received in at least one band of the plurality of bands together with information regarding the transmission band.

Furthermore, a fourth aspect of the technology disclosed in this specification is a communication method for receiving data in a plurality of bands, the method including:

receiving information regarding a first queue for each band and a second queue common to at least two bands of the plurality of bands; and receiving data added with information indicating an order and information indicating a band of first transmission in at least one band of the plurality of bands.

Effects of the Invention

According to the technology disclosed in this specification, it is possible to provide a communication device and a communication method that transmit and receive a wireless signal using a plurality of bands by a queue configuration including a queue and a multi-band transmission queue for each band.

Note that the effects described in this specification are merely examples, and the effects brought by the technology disclosed in this specification are not limited thereto. Furthermore, the technology disclosed in this specification may further exhibit additional effects in addition to the above-described effects.

Still other objects, features, and advantages of the technology disclosed in this specification will become apparent from a more detailed description based on embodiments to be described later and the accompanying drawings.

BRIEF DESCRIPTION OF DRAWINGS

FIG. 26 is a diagram illustrating an example of a frame format in which an MBO queue setup signal is stored.

MODE FOR CARRYING OUT THE INVENTION

Hereinafter, embodiments of the technology disclosed in this specification will be described in detail with reference to the drawings.

Figure 1:
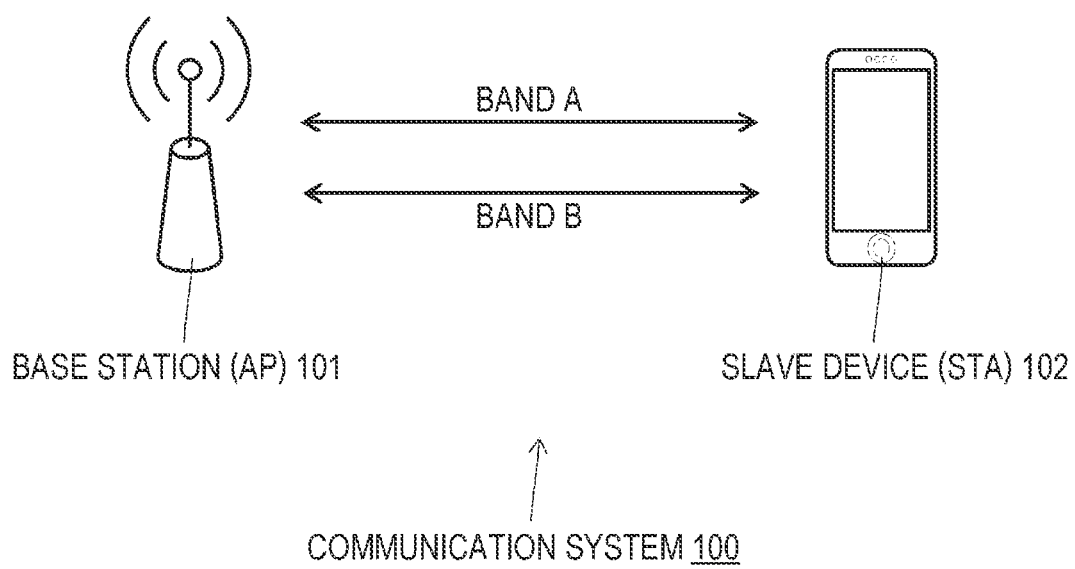
FIG. 1 is a diagram illustrating a configuration example of a communication system 100.

FIG. 1 illustrates a schematic configuration example of a communication system 100 to which the technology proposed in this specification is applied. The illustrated communication system 100 includes one base station (AP) 101 and one slave device (STA) 102. Furthermore, it is assumed that two bands of a band A and a band B are available in the communication system 100. Then, the slave device 102 is connected to the base station 101, and a channel in the band A and a channel in the band B can be bundled and communicated between the base station 101 and the slave device 102.

Here, at least one of the band A or the band B may be a band permitted to be used by database access. Each of the band A and the band B is, for example, a band of 2.4 GHz band, 5 GHz band, or 6 GHz band. Each of the band A and the band B includes a plurality of channels, and one of the channels is a primary channel.

Note that the number, positional relationship, and frequency of the communication devices configuring the communication system 100 illustrated in FIG. 1 are merely examples, and are not limited to the description herein. For example, a network topology in which two or more slave devices are connected to one base station is also assumed. Furthermore, the plurality of different channels in each of the bands A and B may be bundled to perform communication. Furthermore, it is also assumed that one or more bands are further added in addition to the band A and the band B between the base station 101 and the slave device 102, and communication is performed using a total of three or more bands.

Figure 2:
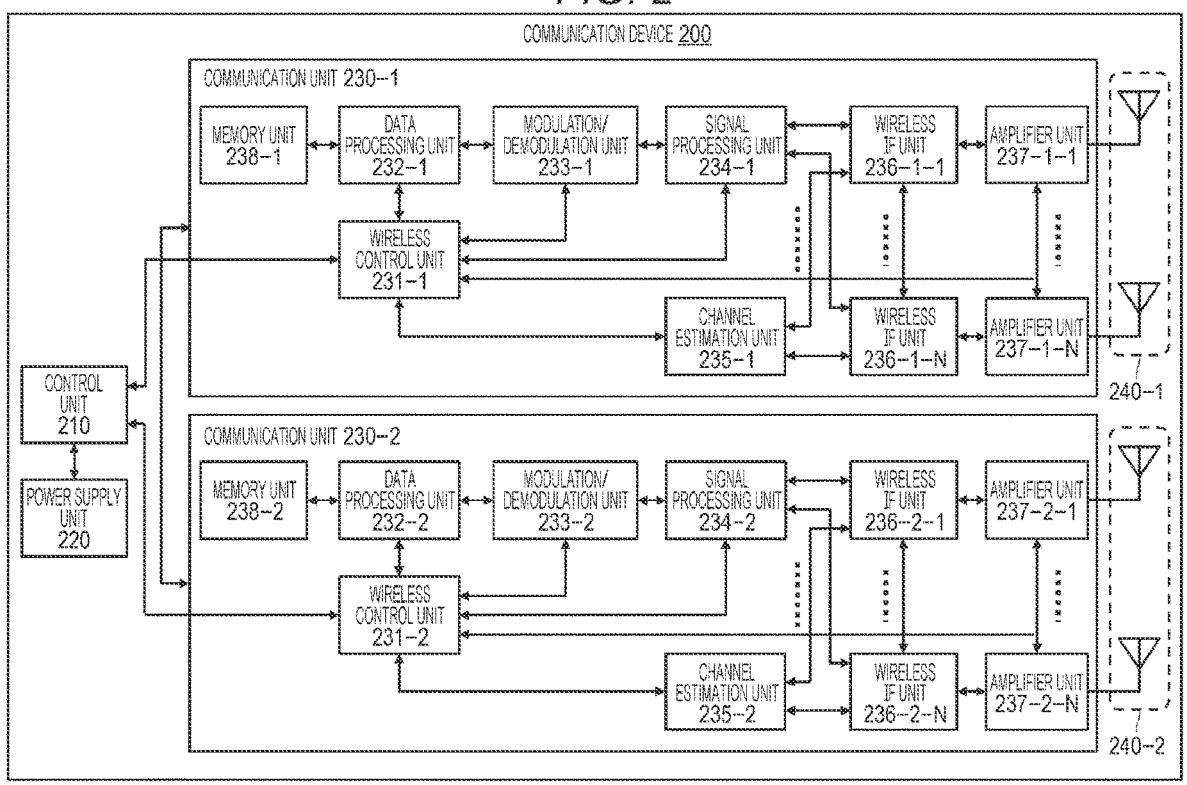
FIG. 2 is a diagram illustrating a functional configuration example of a communication device 200.

FIG. 2 illustrates a functional configuration example of a communication device 200 that can operate as either the base station 101 or the slave device 102 in the communication system 100 according to this embodiment.

The illustrated communication device 200 includes a control unit 210, a power supply unit 220, a plurality of (two in the illustrated example) communication units 230-1, a communication unit 230-2, an antenna unit 240-1 corresponding to the communication unit 230-1, and an antenna unit 240-2 corresponding to the communication unit 230-2.

The combination of the communication unit 230-1 and the antenna unit 240-1 and the combination of the communication unit 230-2 and the antenna unit 240-2 are equipped for each band used by the communication device 200. In the example illustrated in FIG. 2, data communication using the band A is performed by the combination of the communication unit 230-1 and the antenna unit 240-1, and data communication using the band B is performed by the combination of the communication unit 230-2 and the antenna unit 240-2. Therefore, in a case where the communication device 200 uses three or more bands, a combination of a communication unit and an antenna unit (not illustrated) is additionally equipped. The communication unit 230-1 and the communication unit 230-2 may control and exchange information with each other.

Note that the communication unit 230-1 and the communication unit 230-2, and the antenna unit 240-1 and the antenna unit 240-2 have the same configuration, and thus will be referred to as the communication unit 230 and the antenna unit 240 for simplification.

The communication unit 230 is configured by, for example, a processor such as a microprocessor, or a circuit, and includes a memory unit 238, a wireless control unit 231, a data processing unit 232, a modulation/demodulation unit 233, a signal processing unit 234, a channel estimation unit 235, a plurality of wireless interface (IF) units 236-1, . . . , and 236-N arranged in parallel, and amplifier units 237-1, . . . , and 237-N connected in series to the respective wireless interface units 236-1, . . . , and 236-N (here, N is an integer of 2 or more). Then, each antenna element configuring the antenna unit 240 corresponding to the communication unit 230 is connected to each of the amplifier units 237-1, . . . , and 237-N.

When antenna elements in the wireless interface unit 236, the amplifier unit 237, and the antenna unit 240 connected in series are assumed as one set, one or more sets may be the component of the communication unit 230. Furthermore, the functions of the amplifier units 237-1, . . . , and 237-N may be included respectively in each of the corresponding wireless interface units 236-1, . . . , and 236-N.

The memory unit 238 temporarily stores data (for example, transmission data) input from an upper layer of a communication protocol and provides the data to the data processing unit 232. Furthermore, the memory unit 239 temporarily stores data (for example, received data) delivered from the data processing unit 232 and provides the data to the upper layer of the communication protocol. That is, the memory unit 238 is used as a transmission queue or a reception queue.

Note that a part or all of the memory unit 238 may be arranged outside the communication unit 230. Furthermore, the memory unit 238-1 arranged in one communication unit 230-1 may be shared with another communication unit 230-2, or the memory unit 238 arranged outside the communication unit 230 may be shared by a plurality of communication units 230-1, 230-2, and so on.

At the time of transmission in which data is input from the upper layer of its own communication protocol, the data processing unit 232 generates a packet for wireless transmission from the data, further performs processing such as addition of a header for media access control (MAC) or addition of an error detection code, and provides the processed data to the modulation/demodulation unit 233. Furthermore, at the time of reception when there is an input from the modulation/demodulation unit 233, the data processing unit 232 performs MAC header analysis, packet error detection, packet reorder processing, and the like, and provides the processed data to its own protocol upper layer.

The wireless control unit 231 controls the transfer of information between the respective units in the communication device 200. Furthermore, the wireless control unit 231 performs parameter setting in the modulation/demodulation unit 233 and the signal processing unit 234, packet scheduling in the data processing unit 232, parameter setting of the wireless interface unit 236 and the amplifier unit 237, and transmission power control.

At the time of transmission, the modulation/demodulation unit 233 performs encoding, interleaving, and modulation processing on the input data from the data processing unit 232 on the basis of the encoding method and the modulation method set by the wireless control unit 231, generates a data symbol stream, and provides the data symbol stream to the signal processing unit 234. Furthermore, at the time of reception, the modulation/demodulation unit 233 performs demodulation processing, deinterleaving, and decoding processing opposite to those at the time of transmission on the input symbol stream from the signal processing unit 234, and provides data to the data processing unit 232 or the wireless control unit 231.

At the time of transmission, the signal processing unit 234 performs signal processing to be used for spatial separation on the input from the modulation/demodulation unit 233 as necessary, and provides one or more obtained transmission symbol streams to the respective wireless interface units 236-1 and so on. Furthermore, at the time of reception, the signal processing unit 234 performs signal processing on the reception symbol streams input from the respective wireless interface units 236-1 and so on, performs spatial decomposition of the streams as necessary, and provides the streams to the modulation/demodulation unit 233.

The channel estimation unit 235 calculates complex channel gain information of the propagation path from the preamble portion and the training signal portion of the input signals from the respective wireless interface units 236-1 and so on. The calculated complex channel gain information is used for the demodulation processing in the modulation/demodulation unit 233 and the spatial processing in the signal processing unit 234 via the wireless control unit 231.

At the time of transmission, the wireless interface unit 236 converts an input from the signal processing unit 234 into an analog signal, performs filtering, up-conversion to a carrier frequency, and phase control, and transmits the analog signal to the corresponding amplifier unit 237 or antenna unit 240. Furthermore, at the time of reception, the wireless interface unit 236 performs processing such as down-conversion, filtering, and conversion into a digital signal opposite to that at the time of transmission on the input from the corresponding amplifier unit 237 or antenna unit 240, and provides data to the signal processing unit 234 and the channel estimation unit 235.

At the time of transmission, the amplifier unit 237 amplifies the analog signal input from the wireless interface unit 236 to predetermined power and transmits the amplified analog signal to the corresponding antenna element in the antenna unit 240. Furthermore, at the time of reception, the amplifier unit 237 amplifies the signal input from the corresponding antenna element in the antenna unit 240 with low noise to predetermined power, and outputs the amplified signal to the wireless interface unit 236.

Note that at least one of the function at the time of transmission or the function at the time of reception of the amplifier unit 237 may be included in the wireless interface unit 236. Furthermore, at least one of the function at the time of transmission or the function at the time of reception of the amplifier unit 237 may be a component other than the communication unit 230.

One set of the wireless interface unit 236 and the amplifier unit 237 configures one radio frequency (RF) branch. It is assumed that transmission and reception of one band can be performed by one RF branch. In the device configuration example illustrated in FIG. 2, the communication unit 230 includes N RF branches.

The control unit 210 is configured by, for example, a processor such as a microprocessor, or a circuit, and controls the wireless control unit 231 and the power supply unit 220. Furthermore, the control unit 210 may perform at least a part of the above-described operation of the wireless control unit 231 instead of the wireless control unit 231. In particular, in this embodiment, the control unit 210 and the wireless control unit 231 control the operation of each unit in order to realize the operation according to each embodiment described later.

The power supply unit 220 includes a battery power supply or a fixed power supply, and supplies driving power to the communication device 200.

Note that the control unit 210 and the communication unit 230 can be collectively configured by one or a plurality of large scale integrations (LSI).

Furthermore, while the communication device 200 is on standby, the communication unit 230 may transition to a standby state or a sleep state (or, a state where at least a part of the functions is stopped) to achieve low power consumption. In the device configuration example illustrated in FIG. 2, the communication unit 230 includes N RF branches, but may be configured to be able to transition to the standby state or the sleep state for each RF branch.

In this embodiment, the communication device 200 includes a multi-band transmission queue in addition to the queue for each band. Then, the communication device 200 stores data to be transmitted with high priority in the multi-band transmission queue. Here, the data to be transmitted with high priority includes, for example, data requiring low delay and high reliability and retransmission data which is transmitted in each band and fails in communication.

For example, when the data which is transmitted in each band and fails in communication is stored in the multi-band transmission queue, the data is stored together with information on which band the data is transmitted in the first transmission. Thereafter, in a case where the communication device 200 acquires a transmission right in any band, an operation is performed which extracts data from the multi-band transmission queue and transmits the data using the band. For example, in a case where the communication device acquires the transmission rights in a plurality of bands, the data extracted from the multi-band transmission queue is transmitted using the plurality of bands. Furthermore, in a case where the transmission right is acquired in a band other than the band in which the communication fails, the communication device 200 performs an operation of extracting data from the multi-band transmission queue instead of the queue of the band and transmitting the data using the band in which the transmission right is acquired.

Therefore, the communication device 200 according to this embodiment can ensure redundancy by retransmitting the same data in the plurality of bands. Furthermore, the communication device 200 can perform retransmission while avoiding a band having poor propagation characteristics in which communication fails. Furthermore, the communication device 200 improves a success rate of retransmission and improves reliability. Furthermore, the communication device 200 can suppress an increase in delay due to a plurality of times of occurrences of retransmission. Furthermore, the communication device 200 can reduce a plurality of times of retransmission and improve the throughput of the system. Furthermore, the communication device 200 can reduce the data to be held on the reception side and reduce a necessary memory amount.

Therefore, the control unit 210 and the wireless control unit 231 control the operation of each unit in the communication device 200 so as to transmit and receive a signal including information regarding the multi-band transmission queue, store data which fails in communication together with information regarding the band in which the data is transmitted in the multi-band transmission queue, and extract the data from the multi-band transmission queue and transmit the plurality of bands when retransmission is performed.

Note that, in a case where at least one of the band A or the band B is a band permitted to be used by database access, the control unit 210 and the wireless control unit 231 also control an access operation to the database.

Next, a case will be described in which the AP 101 and the STA 102 perform communication using two bands in the communication system 100 illustrated in FIG. 1. However, at least one of the two bands used for communication may be a band permitted to be used by database access (in this case, it is assumed that the use of the band starts after accessing the database). Furthermore, it is assumed that the AP 101 and the STA 102 have the device configuration of the communication system 200 illustrated in FIG. 2.

Figure 3:
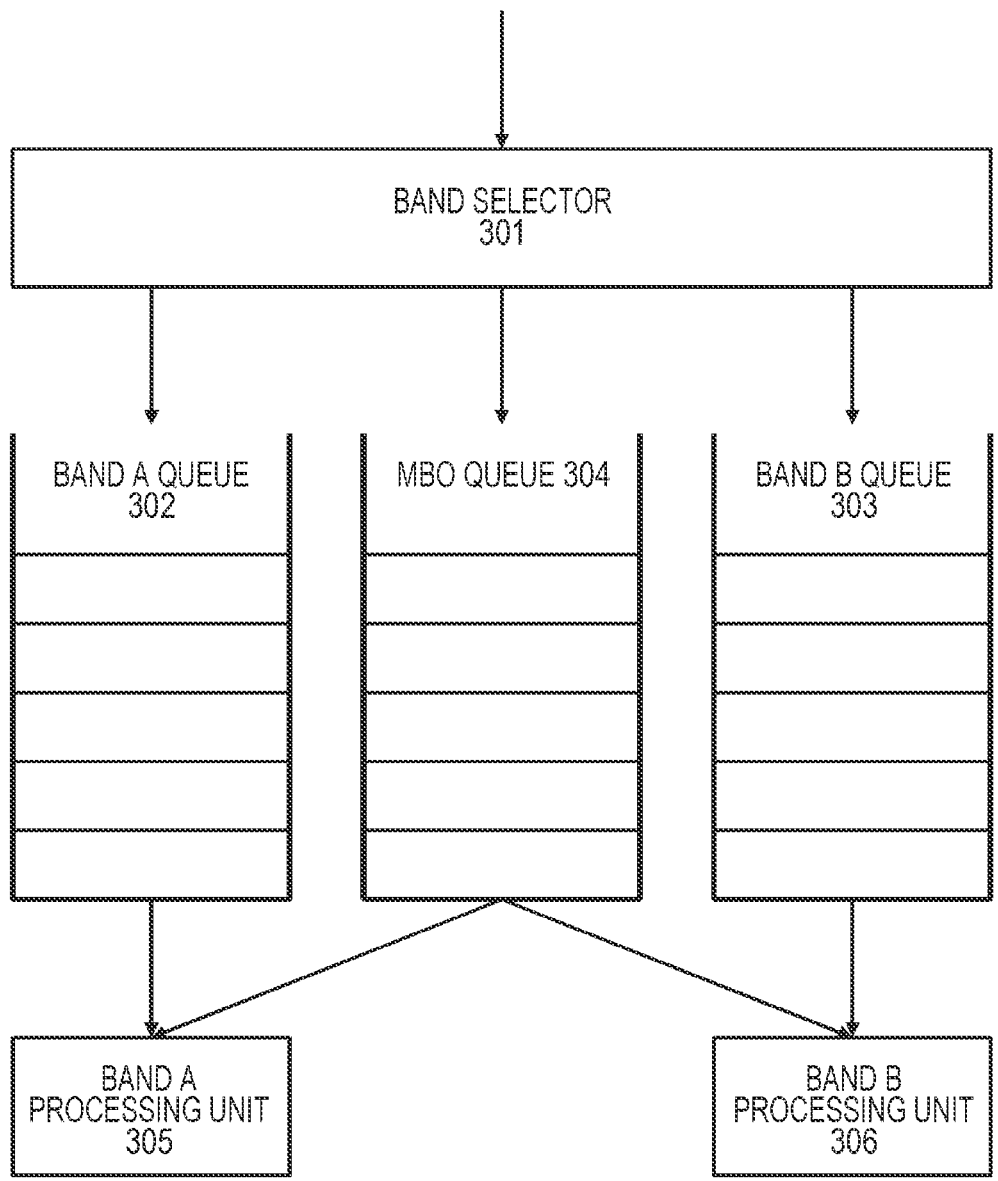
FIG. 3 is a diagram illustrating a configuration example of a queue corresponding to transmission in a plurality of bands.

FIG. 3 illustrates a configuration example of a queue 300 which is equipped in each of the AP 101 and the STA 102 and supports transmission in a plurality of bands.

A band selector 301 determines a queue corresponding to which band the input data is to be stored, and outputs the data to either a determined band A queue 302 or a determined band B queue 303. Furthermore, the band selector 301 determines to store data to be transmitted with high priority in a multiband operation (MBO) queue 304, and outputs the data to the MBO queue 304. The data to be transmitted with high priority includes, for example, data requiring low delay and high reliability and retransmission data.

Each of the queues 302, 303, and 304 temporarily stores data input from the band selector 301 by a first in first out (FIFO) method.

A band A processing unit 305 and a band B processing unit 306 perform processing of acquiring transmission rights in corresponding respective bands (the band A and the band B) and transmitting input data in the corresponding bands. The band A processing unit 305 and the band B processing unit 306 may input data that needs to be retransmitted to the MBO queue 304 after transmission in respective bands.

In a case where the communication device 200 acquires a transmission right in any band, data is output from the queue corresponding to the band to either the band A processing unit 305 or the band B processing unit 306. For example, in a case where the transmission right of the band A is acquired, the data stored in the band A queue 302 is output to the band A processing unit 305 by the FIFO method. Furthermore, in a case where the transmission right of the band B is acquired, the data stored in the band B queue 303 is output to the band B processing unit 306 by the FIFO method.

In a case where data is stored in the MBO queue 304, the data is output to the band A processing unit 305 or the band B processing unit 306 from the MBO queue 304, instead of the respective queues 302 and 303 corresponding to the bands, by the FIFO method. Furthermore, in a case where the communication device 200 acquires the transmission rights in both the band A and the band B, and the data is stored in the MBO queue 304, the same data is output from the MBO queue 304 to both the band A processing unit 305 and the band B processing unit 306.

The control unit 210 or the wireless control unit 231 in the communication unit 230 for each band may realize a function corresponding to the band selector 301 in FIG. 3. Furthermore, a memory unit 238-1 in the communication unit 230-1 for the band A may realize a function corresponding to the band A queue 302, and a memory unit 238-2 in the communication unit 230-2 for the band B may realize a function corresponding to the band B queue 303. One or both of the memory unit 238-1 and the memory unit 238-2 may realize a function of the MBO queue 304. Alternatively, a memory (not illustrated) arranged outside the communication unit 230 may realize the function of the MBO queue 304.

The data processing unit 232-1 in the communication unit 230-1, communication components from the modulation/demodulation unit 233-1 to the amplifier unit 237-1, and the antenna unit 240-1 corresponding to the communication unit 230-1 may realize a function of the band A processing unit 305. Furthermore, the control unit 210 and the wireless control unit 231-1 may realize a part of the function of the band A processing unit 305. Similarly, the data processing unit 232-2 in the communication unit 230-2, communication components from the modulation/demodulation unit 233-2 to the amplifier unit 237-2, and the antenna unit 240-2 corresponding to the communication unit 230-2 may realize a function of the band B processing unit 306. Furthermore, the control unit 210 and the wireless control unit 231-2 may realize a part of the function of the band B processing unit 306.

Figure 4:
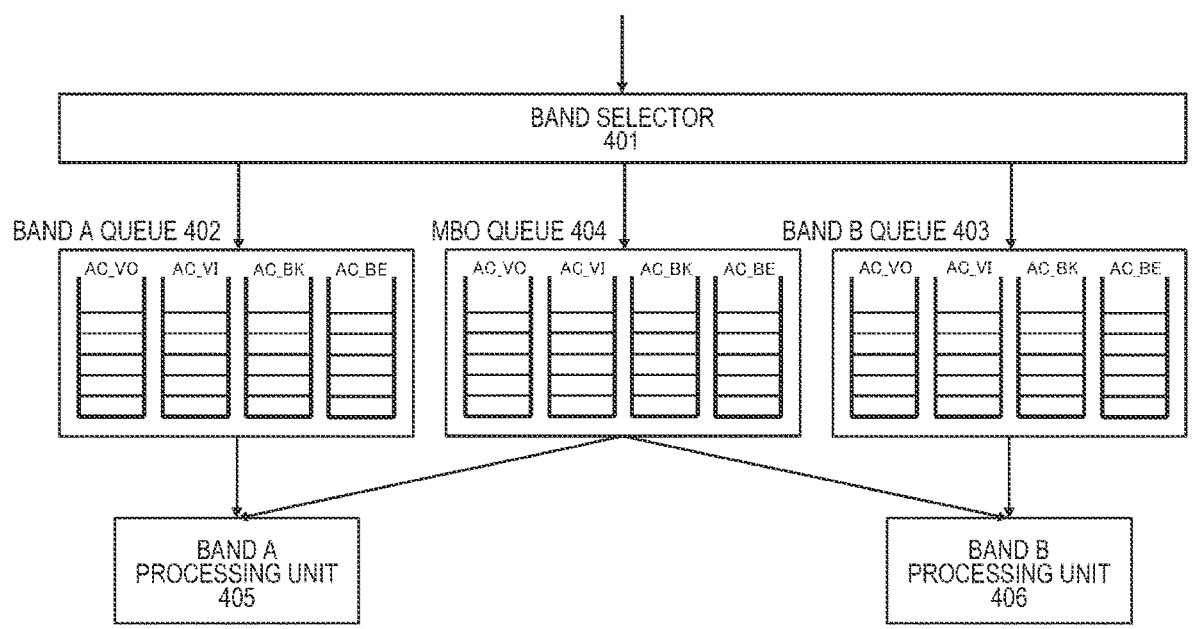
FIG. 4 is a diagram illustrating another configuration example of a queue corresponding to transmission in a plurality of bands.

FIG. 4 illustrates another configuration example of a queue 400 which is equipped by the AP 101 and the STA 102 and supports transmission in a plurality of bands.

A band selector 401 determines a queue corresponding to which band the input data is to be stored, and outputs the data to either a determined band A queue 402 or a determined band B queue 403. Furthermore, the band selector 401 determines to store data to be transmitted with high priority in the MBO queue 404, and outputs the data to the MBO queue 404. The data to be transmitted with high priority includes, for example, data requiring low delay and high reliability and retransmission data.

In the configuration example of the queue 400 illustrated in FIG. 4, each of the queues 402, 403, and 404 is configured by a set of a plurality of sub-queues corresponding to a data type of data to be stored.

For example, in an enhanced distributed channel access (EDCA) method of IEEE 802.11e that performs priority control according to a traffic class, four access categories (also referred to as "AC") of Voice (AC_VO), Video (AC_VI), Vest Effort (AC_BE), and Back Ground (AC_BK) are defined as data types, and priority is assigned to each access category. Each of the queues 402, 403, and 404 includes four sub-queues corresponding to respective access categories, and each sub-queue temporarily stores data of a corresponding access category in a FIFO format.

A band A processing unit 405 and a band B processing unit 406 perform processing of acquiring transmission rights in corresponding respective bands (the band A and the band B) and transmitting input data in the corresponding bands. Then, the band A processing unit 405 and the band B processing unit 406 may input data that needs to be retransmitted to the MBO queue 404 after transmission in respective bands.

In a case where the communication device 200 acquires a transmission right in any band, data is output from the queue corresponding to the band to either the band A processing unit 405 or the band B processing unit 406. For example, in a case where the transmission right of the band A is acquired, data is output to the band A processing unit 405 by the FIFO method in order from the sub-queue corresponding to the access category with high priority in the band A queue 402. Furthermore, in a case where the transmission right of the band B is acquired, data is output to the band B processing unit 406 by the FIFO method in order from the sub-queue corresponding to the access category with high priority in the band B queue 403.

When the communication device 200 acquires the transmission right of either the band A or the band B in a state where the data is stored in the MBO queue 404, the data is output to the band A processing unit 405 or the band B processing unit 406 from the MBO queue 404 instead of the queues 402 and 403 for respective bands. Furthermore, when the communication device 200 acquires the transmission rights in both the band A and the band B in a state where the data is stored in the MBO queue 404, the same data is output from the MBO queue 404 to both the band A processing unit 405 and the band B processing unit 406. Also in this case, in the MBO queue 404, the data is output to one or both of the band A processing unit 405 and the band B processing unit 406 by the FIFO method in order from the sub-queue corresponding to the access category with high priority.

The control unit 210 or the wireless control unit 231 in the communication unit 230 for each band may realize a function corresponding to the band selector 401 in FIG. 4. Furthermore, the memory unit 238-1 in the communication unit 230-1 for the band A may realize a function corresponding to the band A queue 402, and the memory unit 238-2 in the communication unit 230-2 for the band B may realize a function corresponding to the band B queue 403. One or both of the memory unit 238-1 and the memory unit 238-2 may realize a function of the MBO queue 404. Alternatively, a memory (not illustrated) arranged outside the communication unit 230 may realize the function of the MBO queue 404.

The data processing unit 232-1 in the communication unit 230-1, communication components from the modulation/demodulation unit 233-1 to the amplifier unit 237-1, and the antenna unit 240-1 corresponding to the communication unit 230-1 may realize a function of the band A processing unit 405. Furthermore, the control unit 210 and the wireless control unit 231-1 may realize a part of the function of the band A processing unit 405. Similarly, the data processing unit 232-2 in the communication unit 230-2, communication components from the modulation/demodulation unit 233-2 to the amplifier unit 237-2, and the antenna unit 240-2 corresponding to the communication unit 230-2 may realize a function of the band B processing unit 406. Furthermore, the control unit 210 and the wireless control unit 231-2 may realize a part of the function of the band B processing unit 406.

Figure 5:
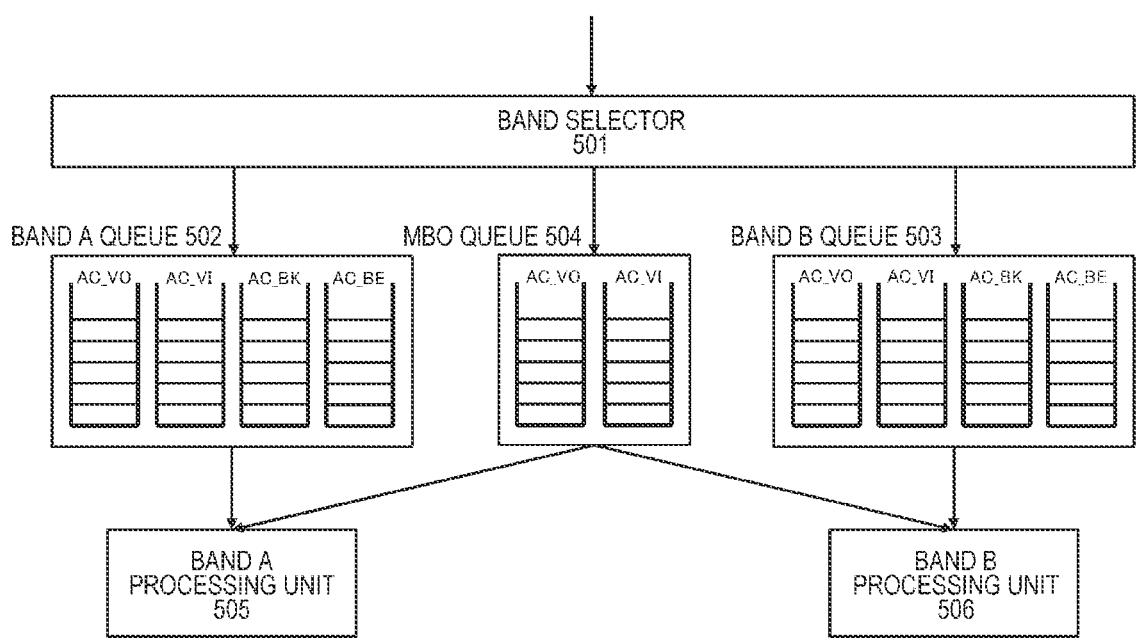
FIG. 5 is a diagram illustrating still another configuration example of a queue corresponding to transmission in a plurality of bands.

FIG. 5 illustrates still another configuration example of a queue 500 that is equipped by the AP 101 and the STA 102 and supports transmission in a plurality of bands.

A band selector 501 determines a queue corresponding to which band the input data is to be stored, and outputs the data to either a determined band A queue 502 or a determined band B queue 503. Furthermore, the band selector 501 determines to store the data to be transmitted with high priority in the MBO queue 504, and outputs the data to the MBO queue 504. The data to be transmitted with high priority includes, for example, data requiring low delay and high reliability and retransmission data.

In the configuration example of the queue 500 illustrated in FIG. 5, each of the queues 502, 503, and 504 is configured by a set of a plurality of sub-queues corresponding to a data type of data to be stored. Each sub-queue temporarily stores data of a corresponding data type in a FIFO format. The data type here corresponds to an access category defined in the EDCA method of IEEE 802.11e (same as above). However, while the band A queue 502 and the band B queue 503 are configured by as many sub-queues as all the corresponding access categories, the MBO queue 504 is configured by only the sub-queues corresponding to some of the access categories. That is, the number of sub-queues is different between the band A queue 502 and the band B queue 503, and the MBO queue 504. Specifically, the MBO queue 504 is equipped with only sub-queues corresponding to two access categories of Voice (AC_VO) and Video (AC_VI) with high priority.

A band A processing unit 505 and a band B processing unit 506 perform processing of acquiring transmission rights in corresponding respective bands (the band A and the band B) and transmitting input data in the corresponding bands. Then, the band A processing unit 505 and the band B processing unit 506 input only the data of the access category corresponding to the sub-queue of the MBO queue 504 among the data that needs to be retransmitted after being transmitted in each band to the corresponding sub-queue in the MBO queue 504. Data that does not correspond to any access category of the sub-queues equipped in the MBO queue 504 among the data that needs to be retransmitted may be discarded without retransmission.

In a case where the communication device 200 acquires a transmission right in any band, data is output from the queue corresponding to the band to either the band A processing unit 505 or the band B processing unit 506. For example, in a case where the transmission right of the band A is acquired, data is output to the band A processing unit 505 by the FIFO method in order from the sub-queue corresponding to the access category with high priority in the band A queue 502. Furthermore, in a case where the transmission right of the band B is acquired, data is output to the band B processing unit 506 by the FIFO method in order from the sub-queue corresponding to the access category with high priority in the band B queue 503.

When the communication device 200 acquires the transmission right of either the band A or the band B in a state where the data is stored in the MBO queue 504, the data is output to the band A processing unit 505 or the band B processing unit 506 from the MBO queue 504 instead of the queues 502 and 503 for respective bands. Furthermore, when the communication device 200 acquires the transmission rights in both the band A and the band B in a state where the data is stored in the MBO queue 504, the same data is output from the MBO queue 504 to both the band A processing unit 405 and the band B processing unit 506. Also in this case, in the MBO queue 504, the data is output to one or both of the band A processing unit 505 and the band B processing unit 506 by the FIFO method in order from the sub-queue corresponding to the access category with high priority.

The control unit 210 or the wireless control unit 231 in the communication unit 230 for each band may realize a function corresponding to the band selector 501 in FIG. 5. Furthermore, the memory unit 238-1 in the communication unit 230-1 for the band A may realize a function corresponding to the band A queue 502, and the memory unit 238-2 in the communication unit 230-2 for the band B may realize a function corresponding to the band B queue 503. One or both of the memory unit 238-1 and the memory unit 238-2 may realize a function of the MBO queue 504. Alternatively, a memory (not illustrated) arranged outside the communication unit 230 may realize the function of the MBO queue 504.

The data processing unit 232-1 in the communication unit 230-1, communication components from the modulation/demodulation unit 233-1 to the amplifier unit 237-1, and the antenna unit 240-1 corresponding to the communication unit 230-1 may realize a function of the band A processing unit 505. Furthermore, the control unit 210 and the wireless control unit 231-1 may realize a part of the function of the band A processing unit 505. Similarly, the data processing unit 232-2 in the communication unit 230-2, communication components from the modulation/demodulation unit 233-2 to the amplifier unit 237-2, and the antenna unit 240-2 corresponding to the communication unit 230-2 may realize a function of the band B processing unit 506. Furthermore, the control unit 210 and the wireless control unit 231-2 may realize a part of the function of the band B processing unit 506.

Figure 6:
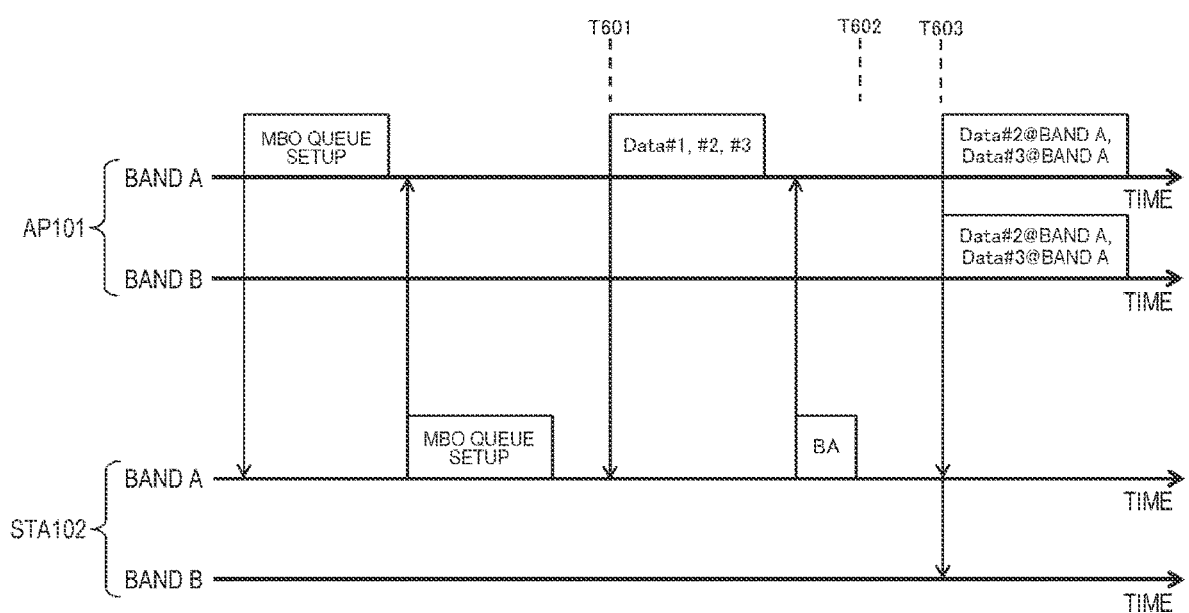
FIG. 6 is a diagram illustrating a communication sequence example in a case where data communication is performed between an AP 101 and a STA 102 using a band A and a band B.
Figure 7:
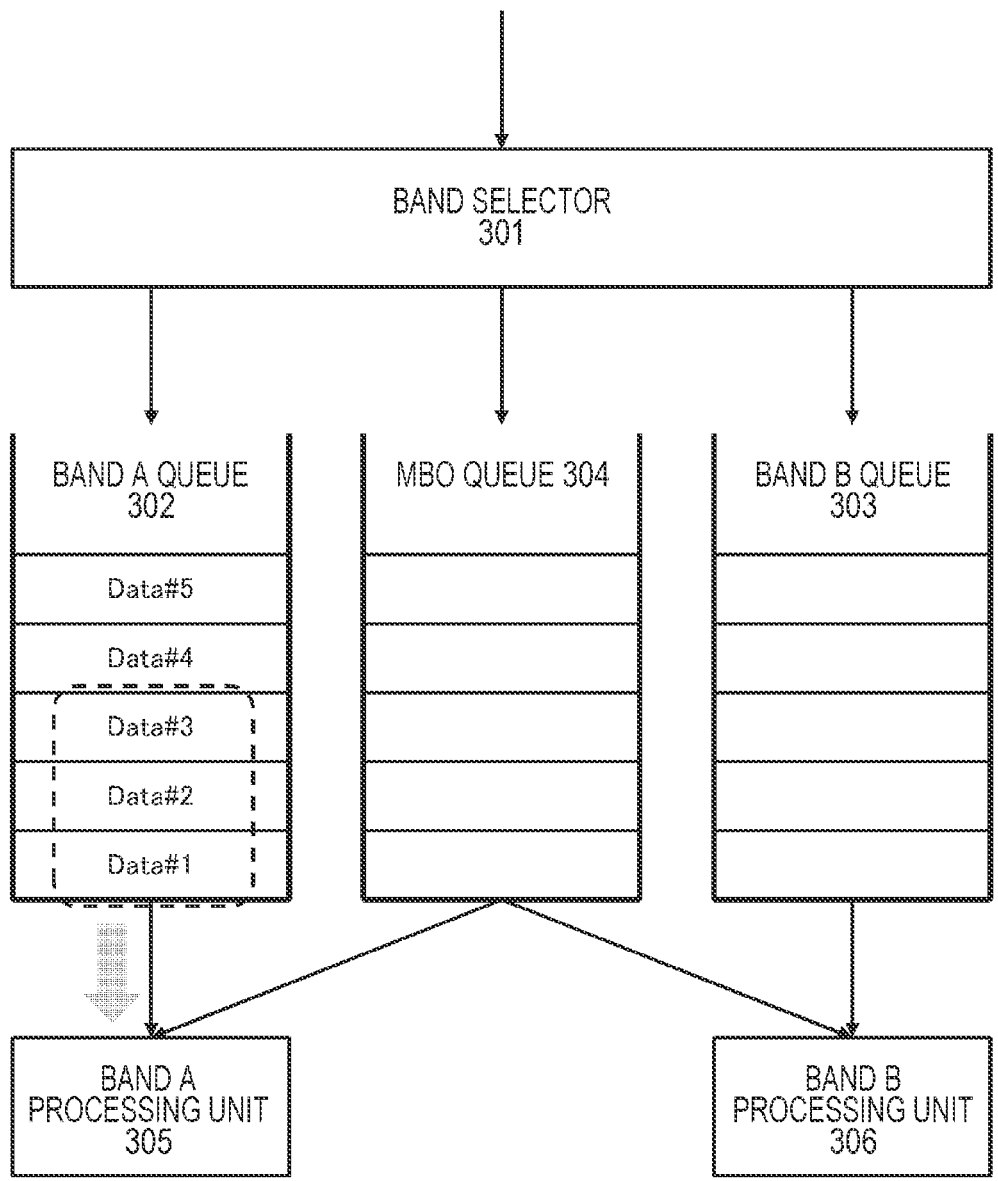
FIG. 7 is a diagram illustrating an operation example of a queue in a case where the data communication illustrated in FIG. 6 is performed.
Figure 8:
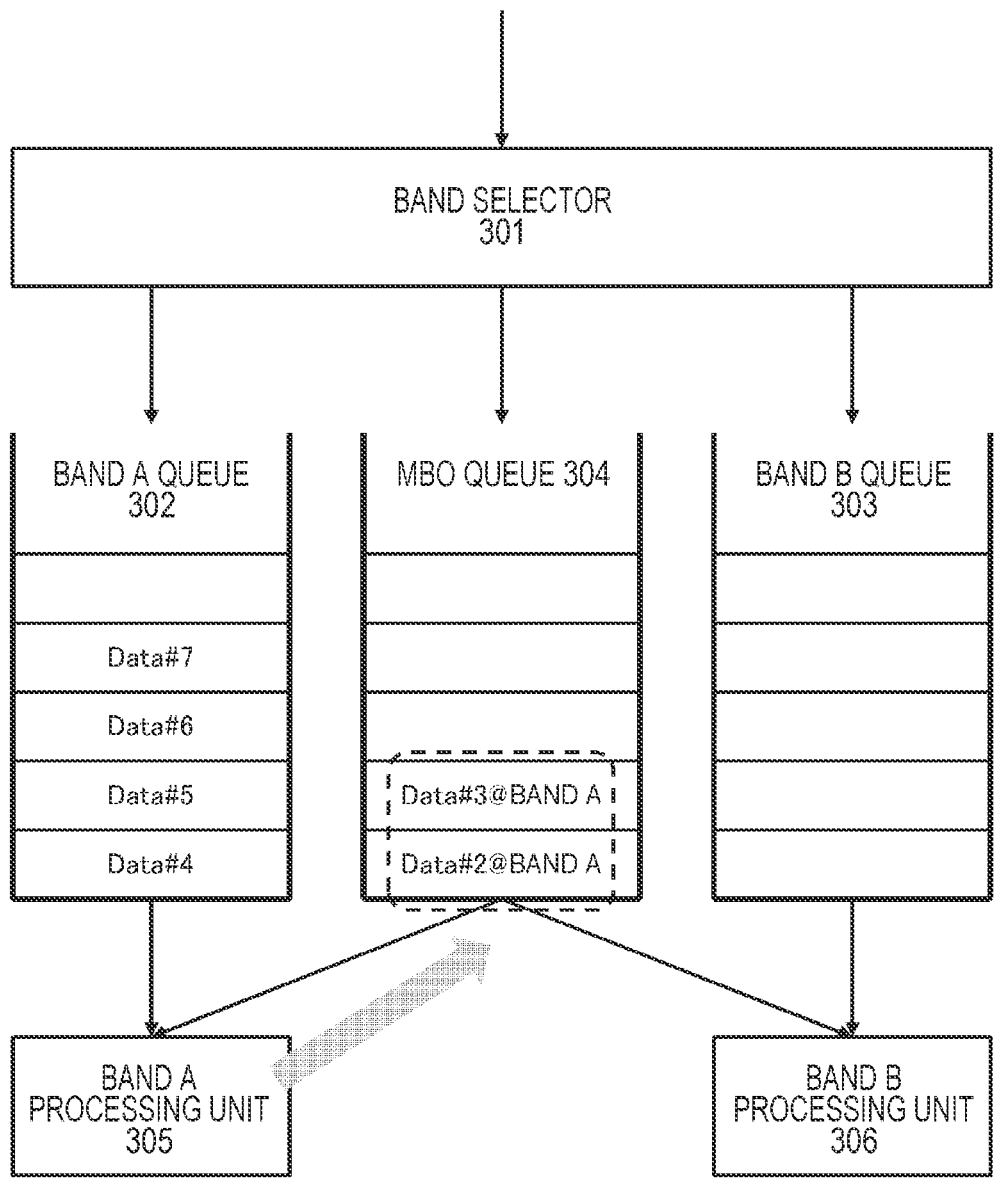
FIG. 8 is a diagram illustrating the operation example of the queue in a case where the data communication illustrated in FIG. 6 is performed.
Figure 9:
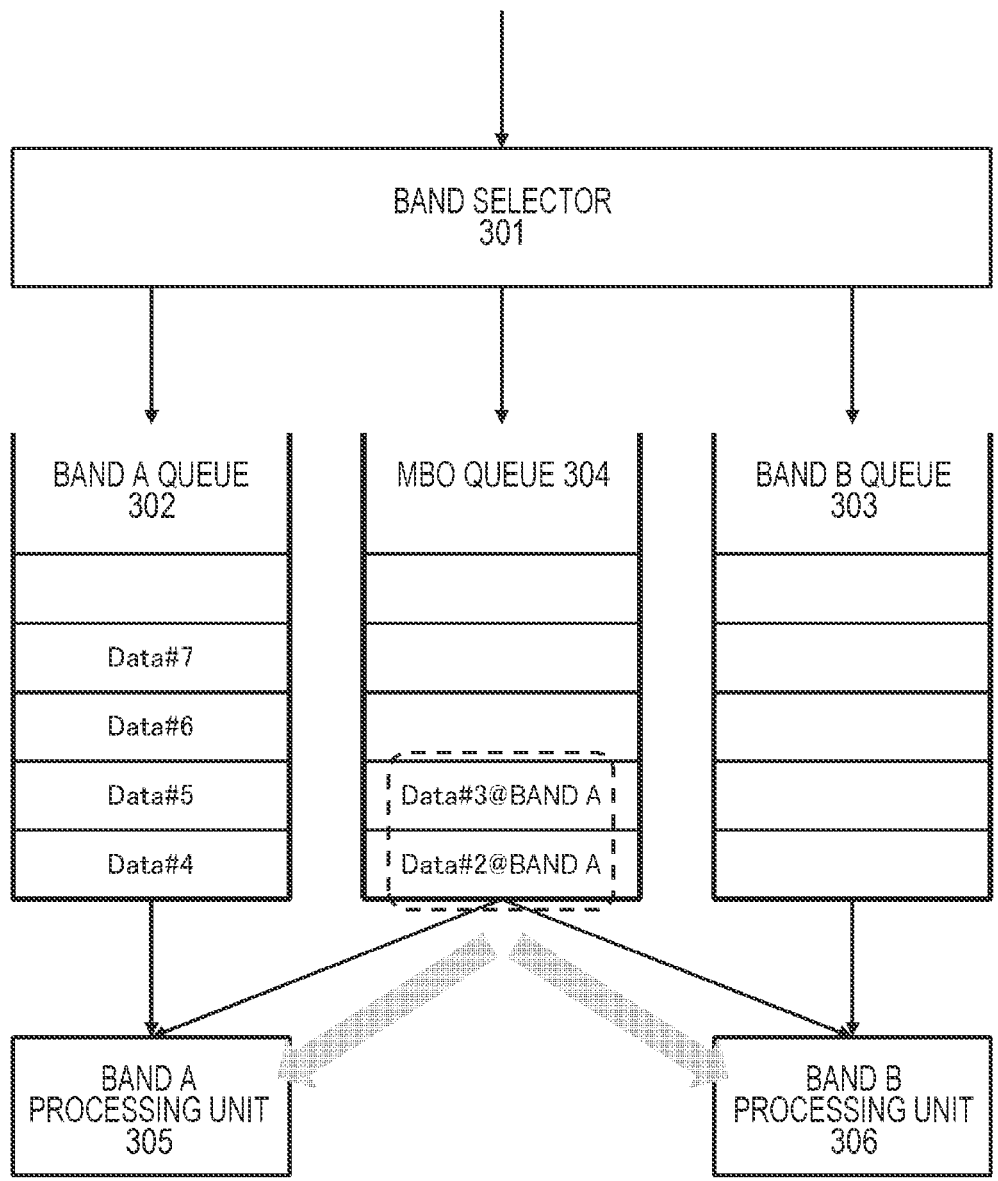
FIG. 9 is a diagram illustrating the operation example of the queue in a case where the data communication illustrated in FIG. 6 is performed.

FIG. 6 illustrates a communication sequence example in a case where data communication is performed between the AP 101 and the STA 102 using the band A and the band B in the communication system 100 illustrated in FIG. 1. However, a horizontal axis is a time axis, and an operation example for each time in each band of the band A and the band B of the AP 101 and an operation example for each time in each band of the band A and the band B of the STA 102 are illustrated. Furthermore, FIGS. 7 to 9 illustrate an operation example of a queue in a case where the data communication illustrated in FIG. 6 is performed between the AP 101 and the STA 102 using the band A and the band B. Here, the queue and the sub-queue are not distinguished, and are simply referred to as "queue" (or it is assumed that the AP 101 uses the queue configuration illustrated in FIG. 3.).

In a case where at least one of the band A or the band B used in the data communication between the AP 101 and the STA 102 is a band permitted to be used by the database access, it is assumed that the use of the band is permitted by the database access in advance.

First, the AP 101 and the STA 102 transmit and receive, to/from each other, an MBO queue setup signal including information regarding a queue corresponding to transmission of a plurality of bands by using the band A. However, the AP 101 and the STA 102 may transmit and receive the MBO queue setup signal by using the band B instead of the band A.

The MBO queue setup signal includes information regarding queue configurations corresponding to the AP 101 and the STA 102. Furthermore, the information regarding the queue configuration may include information regarding the presence or absence of an MBO queue, information regarding a data type (access category) corresponding to the MBO queue (or each sub-queue included in the MBO queue), and information regarding the amount of data which can be held by the MBO queue.

Furthermore, the MBO queue setup signal may include information regarding a band in which the AP 101 retransmits data, information regarding a band in which the AP 101 transmits data, and information regarding a band in which the STA 102 performs a notification of a reception result (for example, a band in which data is transmitted or all available bands are designated as the band in which the notification of the reception result is performed). The "information regarding a band" described here may be information regarding a specific frequency and bandwidth, or may be information regarding an identifier which specifies the frequency and bandwidth. Furthermore, the MBO queue setup signal may include information regarding an identifier indicating the type of data transmitted and received by the AP 101 and the STA 102, an identifier indicating the order of data to be transmitted, and an identifier indicating the priority of data transmitted and received by the AP 101 and the STA 102. Furthermore, the MBO queue setup signal may include information regarding the upper limit number of times of retransmission of data transmitted and received by the AP 101 and the STA 102, and the time until the data to be transmitted and received is discarded.

The MBO queue setup signal may be transmitted when the AP 101 and the STA 102 establish a connection. The MBO queue setup signal may be transmitted as an association request frame and an association response frame, a reassociation request frame and a reassociation response frame, a probe request frame, and a probe response frame defined in IEEE 802.11 which is a representative standard of a wireless LAN.

After transmitting and receiving the MBO queue setup signal to and from the STA 102, when acquiring the transmission right in the band A, the AP 101 transmits a data signal including data addressed to the STA 102 in the band A at time T601. FIG. 7 illustrates an operation example of the queue on the AP 101 side at time T601. The data signal includes, for example, three pieces of data to which #1, #2, and #3 are each assigned as identifiers indicating the order. At this time T601, the AP 101 sequentially extracts data #1, data #2, and data #3 assigned with the identifiers indicating the order from the band A queue 302, and performs transfer to the band A processing unit 305, thereby transmitting the data signal.

The STA 102 receives and demodulates the data signal transmitted from the AP 101 in the band A, thereby acquiring data addressed to the STA itself. Thereafter, the STA 102 transmits a block ack (BA) signal including the reception result to the AP 101 in the band A. In the example illustrated in FIG. 6, the STA 102 notifies the AP 101 of the BA signal indicating the failure in the demodulation of the data assigned with #2 and #3 as the identifiers indicating the order in the band A. The STA transmits the BA signal using, for example, a band designated by the MBO queue setup signal.

When receiving the BA signal returned from the STA 102 in the band A, the AP 101 determines data to be retransmitted on the basis of the reception result included in the BA signal. In the example illustrated in FIG. 6, the AP 101 determines retransmission of the data assigned with #2 and #3 as the identifiers indicating the order and transmitted in the band A at time T602. Then, at time T602, the AP 101 stores data #2 and data #3 determined to perform retransmission in the MBO queue 304. When the retransmission data is stored in the MBO queue 304, the retransmission data is stored together with information indicating the band in which each piece of data is first transmitted. FIG. 8 illustrates an operation example of the queue on the AP 101 side at time T602. For example, data #2@band A indicates that data #2 is data first transmitted in the band A, and data #3@band A indicates that data #3 is data first transmitted in the band A.

After determining the data to be retransmitted, when acquiring the transmission rights in the band A and the band B at time T603, the AP 101 transmits a data signal including the above-described data to be retransmitted in each of the band A and the band B. At this time T603, the AP 101 extracts data #2@band A and data #3@band A from the MBO queue 304 and performs transfer to the band A processing unit 305 and the band B processing unit 306, thereby transmitting the data signal. FIG. 9 illustrates an operation example of the queue on the AP 101 side at time T603.

The data signal to be transmitted includes information regarding a band in which the stored data is first transmitted. Furthermore, the data signal may include information regarding the amount of data stored in the MBO queue 304. The information regarding the amount of data may be, for example, information regarding all the amounts of data stored in the MBO queue 304. Alternatively, in a case where the MBO queue 404 illustrated in FIG. 4 or the MBO queue 504 illustrated in FIG. 5 is configured by a plurality of sub-queues, the information regarding the amount of data may be information regarding the amount of data stored in the sub-queue corresponding to the access category of the retransmission data.

When normally receiving the retransmission data from the AP 101, from the identifier indicating the order and the information indicating the band of the first transmission, the STA 102 associates the data first received in the band A with the retransmission data in the band A and the band B, correctly rearranges the order, and performs transfer to the upper layer.

In a case where the received data signal includes the information regarding the amount of data stored in the MBO queue 304, the STA 102 may, for example, reduce other processing loads for the retransmission processing or prioritize the transmission of the AP 101 by predicting the amount of data to be retransmitted from the AP 101 in the future, for example, and suppressing the amount of transmission data to be transmitted from itself. When the STA 102 side performs transmission and consumes communication resources, the number of communication resources available on the AP 101 side having data to be preferentially transmitted decreases, and transmission is not possible. However, the STA 102 suppresses the amount of transmission data, so that such a problem can be reduced.

According to the communication sequence illustrated in FIG. 6, the AP 101 as a data transmission source can ensure redundancy by retransmitting the same data in a plurality of bands. Furthermore, the AP 101 improves a success rate of retransmission and improves reliability. Furthermore, the AP 101 can suppress an increase in delay due to a plurality of times of occurrences of retransmission. Furthermore, the AP 101 can improve a system throughput by reducing a plurality of times of retransmission.

Note that, in the example of the communication sequence example illustrated in FIG. 6, the AP 101 is on the data transmission side, and the STA 102 is on the data reception side. However, it is necessarily understood that this also holds true even when the AP 101 is switched to the data reception side, and the STA 102 is switched to the data transmission side.

Figure 10:
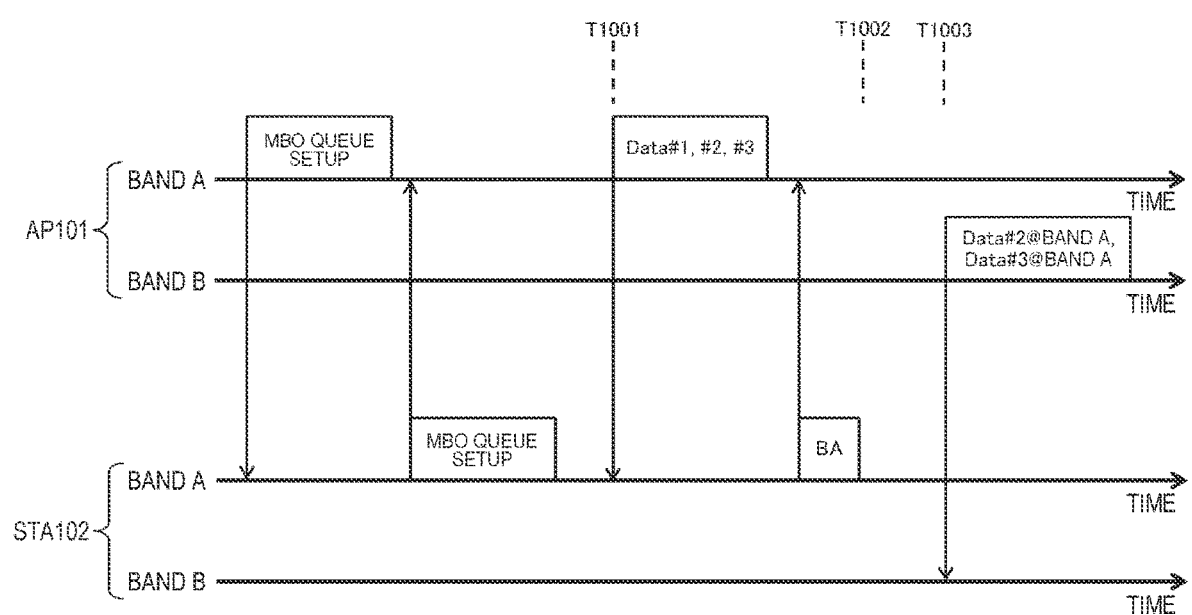
FIG. 10 is a diagram illustrating another communication sequence example in a case where data communication is performed between the AP 101 and the STA 102 using the band A and the band B.
Figure 11:
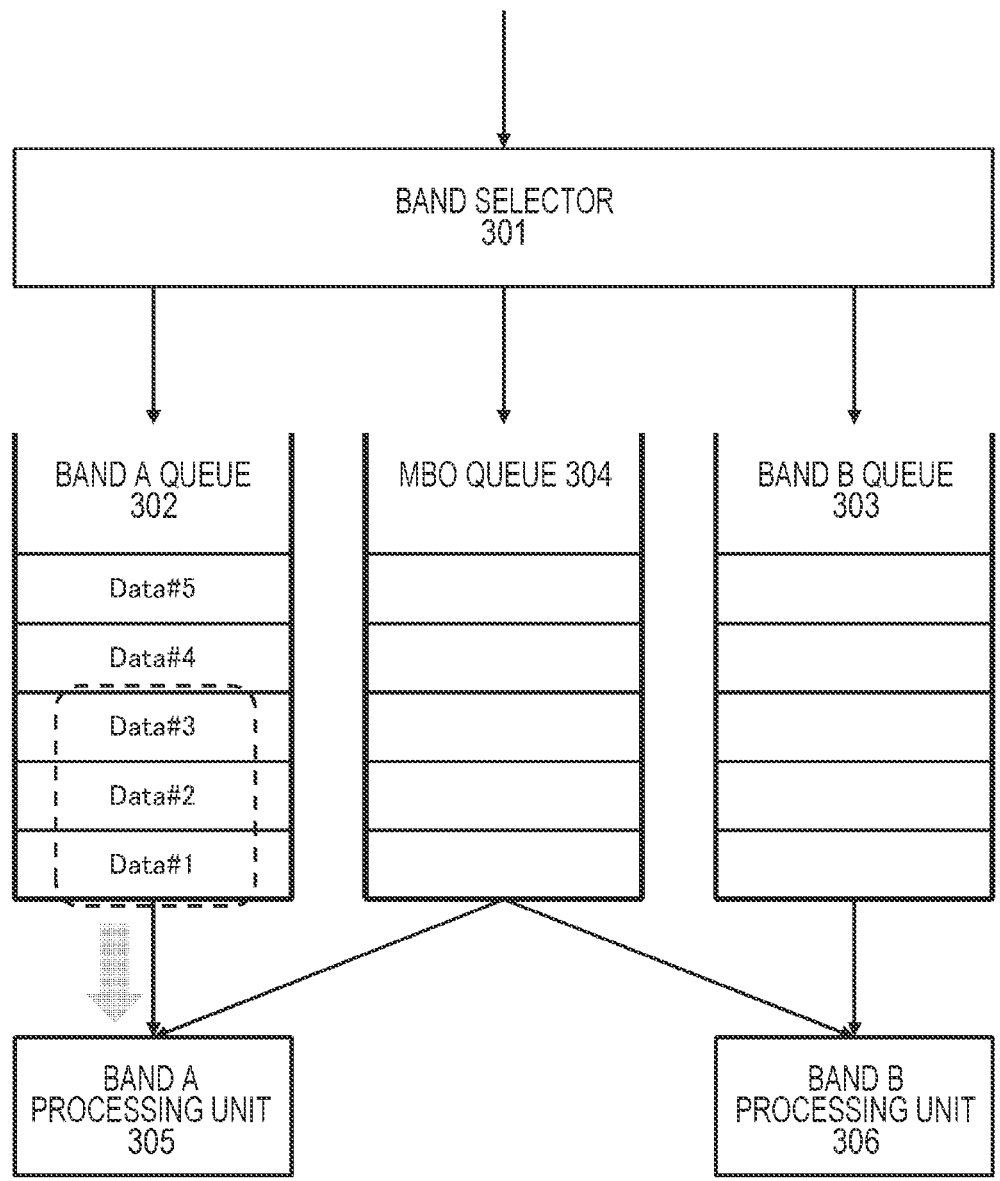
FIG. 11 is a diagram illustrating an operation example of a queue in a case where the data communication illustrated in FIG. 10 is performed.
Figure 12:
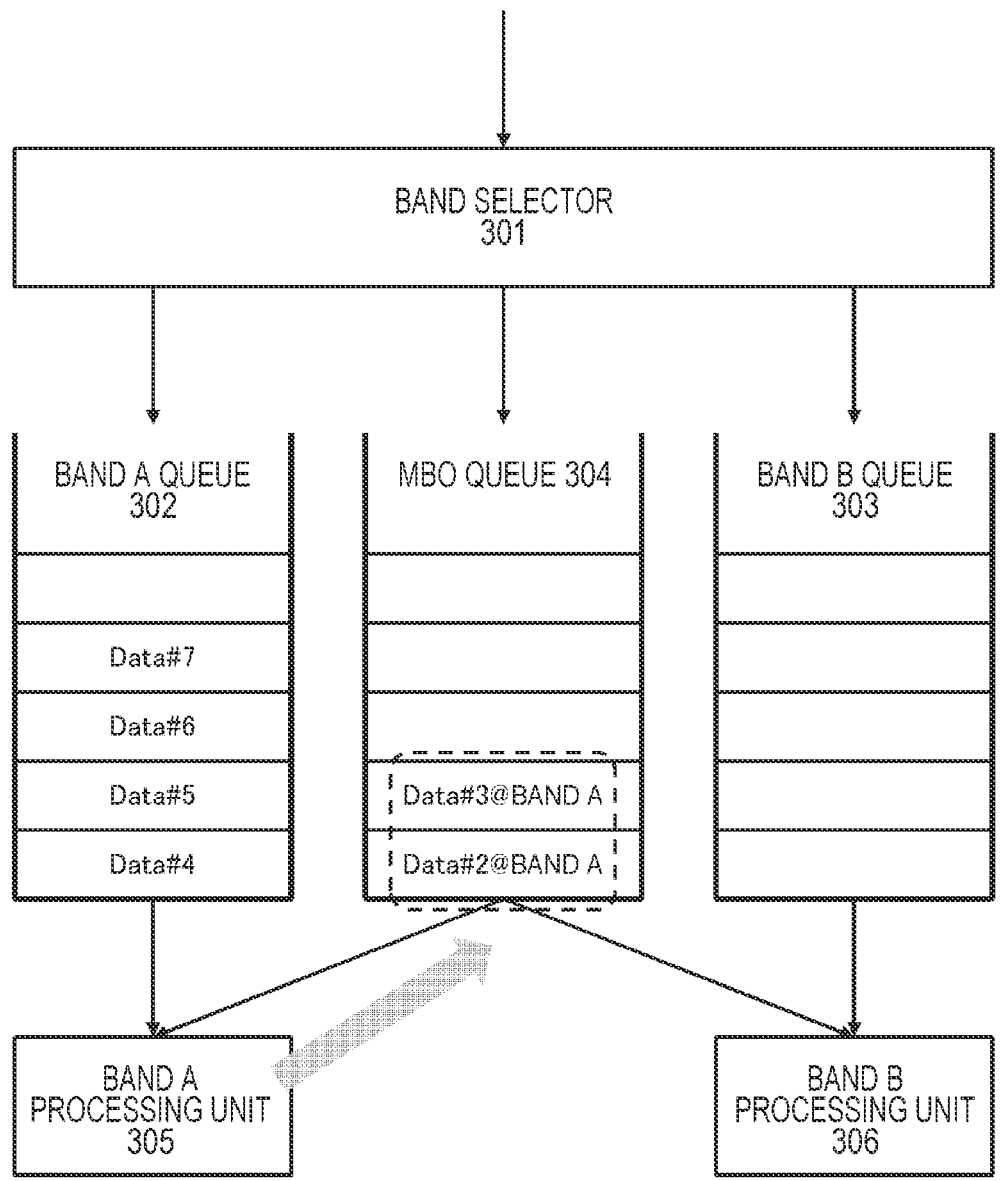
FIG. 12 is a diagram illustrating the operation example of the queue in a case where the data communication illustrated in FIG. 10 is performed.
Figure 13:
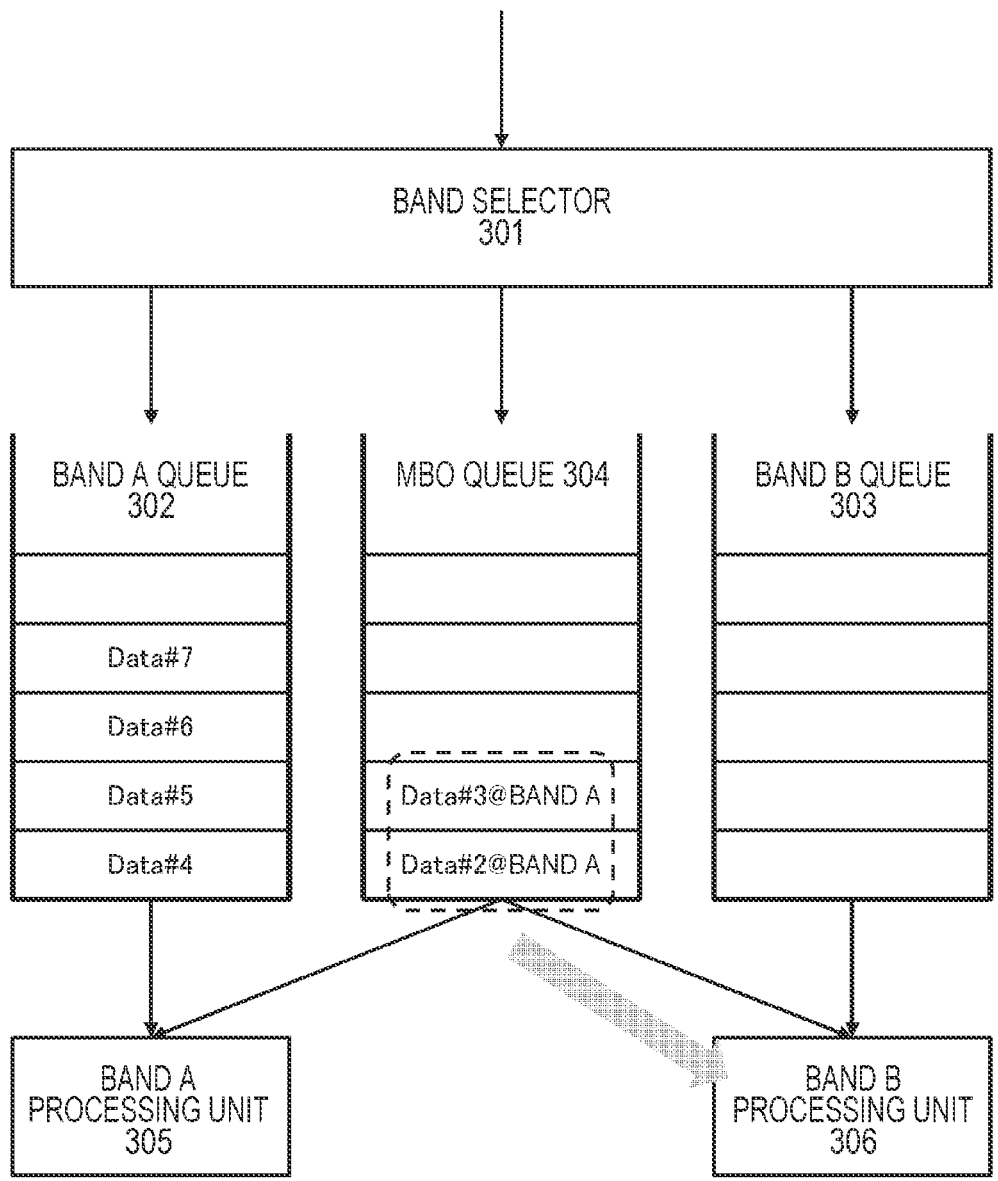
FIG. 13 is a diagram illustrating the operation example of the queue in a case where the data communication illustrated in FIG. 10 is performed.

FIG. 10 illustrates another communication sequence example in a case where data communication is performed between the AP 101 and the STA 102 using the band A and the band B in the communication system 100 illustrated in FIG. 1. However, a horizontal axis is a time axis, and an operation example for each time in each band of the band A and the band B of the AP 101 and an operation example for each time in each band of the band A and the band B of the STA 102 are illustrated. Furthermore, FIGS. 11 to 13 illustrate an operation example of a queue in a case where the data communication illustrated in FIG. 10 is performed between the AP 101 and the STA 102 using the band A and the band B. Here, the queue and the sub-queue are not distinguished, and are simply referred to as "queue" (or it is assumed that the AP 101 uses the queue configuration illustrated in FIG. 3.).

In a case where at least one of the band A or the band B used in the data communication between the AP 101 and the STA 102 is a band permitted to be used by the database access, it is assumed that the use of the band is permitted by the database access in advance.

First, the AP 101 and the STA 102 transmit and receive, to/from each other, an MBO queue setup signal including information regarding a queue corresponding to transmission of a plurality of bands by using the band A (the same as above). The AP 101 and the STA 102 may transmit and receive the MBO queue setup signal by using the band B instead of the band A.

Then, when acquiring the transmission right in the band A, the AP 101 transmits a data signal including data addressed to the STA 102 in the band A at time T1001. FIG. 11 illustrates an operation example of the queue on the AP 101 side at time T1001. At this time T1001, the AP 101 sequentially extracts data #1, data #2, and data #3 assigned with the identifiers indicating the order from the band A queue 302, and performs transfer to the band A processing unit 305, thereby transmitting the data signal (same as above).

The STA 102 receives and demodulates the data signal transmitted from the AP 101 in the band A, thereby acquiring data addressed to the STA itself. Thereafter, the STA 102 transmits a BA signal including the reception result to the AP 101 in the band A. In the example illustrated in FIG. 10, the STA 102 notifies the AP 101 of the BA signal indicating the failure in the demodulation of the data assigned with #2 and #3 as the identifiers indicating the order in the band A. The STA transmits the BA signal using, for example, a band designated by the MBO queue setup signal.

When receiving the BA signal returned from the STA 102 in the band A, the AP 101 determines data to be retransmitted on the basis of the reception result included in the BA signal. In the example illustrated in FIG. 10, the AP 101 determines retransmission of the data assigned with #2 and #3 as the identifiers indicating the order and transmitted in the band A at time T1002. Then, at time T1002, the AP 101 stores data #2 and data #3 determined to perform retransmission in the MBO queue 304. When the retransmission data is stored in the MBO queue 304, the retransmission data is stored together with information indicating the band in which each piece of data is first transmitted. FIG. 12 illustrates an operation example of the queue on the AP 101 side at time T1002.

After determining the data to be retransmitted, when acquiring the transmission right in the band B different from that of the first transmission at time T1003, the AP 101 transmits a data signal including the above-described data to be retransmitted in the band B. At this time T1003, the AP 101 extracts data #2@band A and data #3@band A from the MBO queue 304 and performs transfer to the band B processing unit 306, thereby transmitting the data signal. FIG. 13 illustrates an operation example of the queue on the AP 101 side at time T1003.

The data signal to be transmitted includes information regarding a band in which the stored data is first transmitted. Furthermore, the data signal may include information regarding the amount of data stored in the MBO queue 304. The information regarding the amount of data may be, for example, information regarding all the amounts of data stored in the MBO queue 304. Alternatively, in a case where the MBO queue 404 illustrated in FIG. 4 or the MBO queue 504 illustrated in FIG. 5 is configured by a plurality of sub-queues, the information regarding the amount of data may be information regarding the amount of data stored in the sub-queue corresponding to the access category of the retransmission data.

When normally receiving the retransmission data from the AP 101, from the identifier indicating the order and the information indicating the band of the first transmission, the STA 102 associates the data first received in the band A with the retransmission data in the band A and the band B, correctly rearranges the order, and performs transfer to the upper layer.

In a case where the received data signal includes the information regarding the amount of data stored in the MBO queue 304, the STA 102 may, for example, reduce other processing loads for the retransmission processing or prioritize the transmission of the AP 101 by predicting the amount of data to be retransmitted from the AP 101 in the future, for example, and suppressing the amount of transmission data to be transmitted from itself. When the STA 102 side performs transmission and consumes communication resources, the number of communication resources available on the AP 101 side having data to be preferentially transmitted decreases, and transmission is not possible. However, the STA 102 suppresses the amount of transmission data, so that such a problem can be reduced.

According to the communication sequence illustrated in FIG. 10, the AP 101 as a data transmission source can ensure redundancy by retransmitting the same data in a plurality of bands. Furthermore, the AP 101 improves a success rate of retransmission and improves reliability. Furthermore, the AP 101 can suppress an increase in delay due to a plurality of times of occurrences of retransmission. Furthermore, the AP 101 can improve a system throughput by reducing a plurality of times of retransmission.

Note that, in the example of the communication sequence example illustrated in FIG. 10, the AP 101 is on the data transmission side, and the STA 102 is on the data reception side. However, it is necessarily understood that this also holds true even when the AP 101 is switched to the data reception side, and the STA 102 is switched to the data transmission side.

Figure 14:
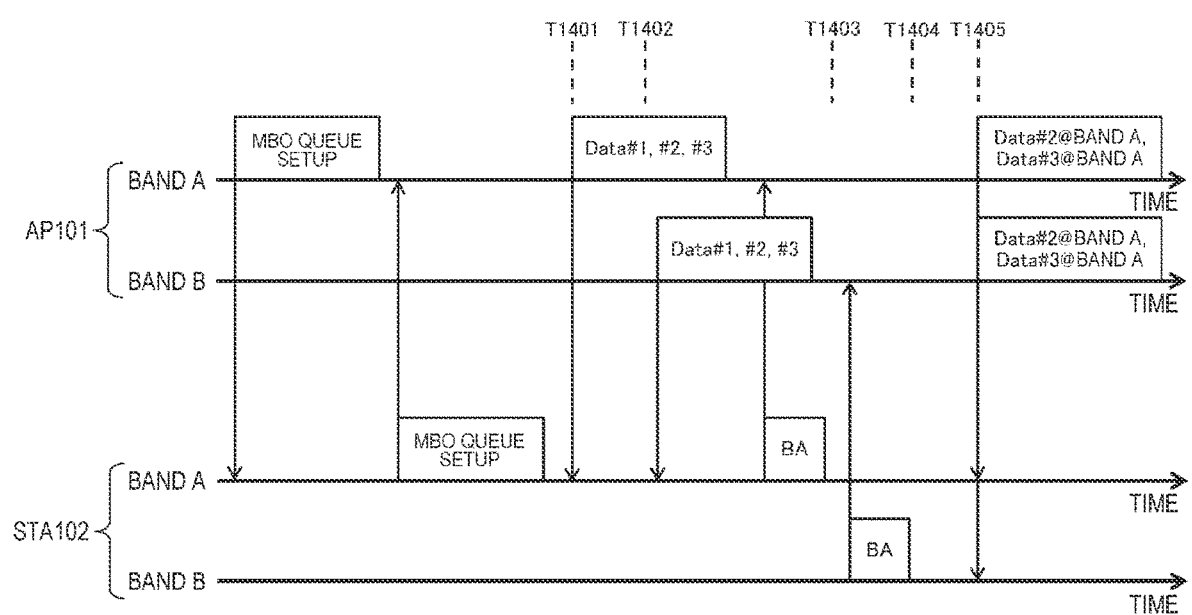
FIG. 14 is a diagram illustrating still another communication sequence example in a case where data communication is performed between the AP 101 and the STA 102 using the band A and the band B.

FIG. 14 illustrates still another communication sequence example in a case where data communication is performed between the AP 101 and the STA 102 using the band A and the band B in the communication system 100 illustrated in FIG. 1. However, a horizontal axis is a time axis, and an operation example for each time in each band of the band A and the band B of the AP 101 and an operation example for each time in each band of the band A and the band B of the STA 102 are illustrated. Furthermore, FIGS. 15 to 19 illustrate an operation example of a queue in a case where the data communication illustrated in FIG. 14 is performed between the AP 101 and the STA 102 using the band A and the band B. Here, the queue and the sub-queue are not distinguished, and are simply referred to as "queue" (or it is assumed that the AP 101 uses the queue configuration illustrated in FIG. 3.).

In a case where at least one of the band A or the band B used in the data communication between the AP 101 and the STA 102 is a band permitted to be used by the database access, it is assumed that the use of the band is permitted by the database access in advance.

First, the AP 101 and the STA 102 transmit and receive, to/from each other, an MBO queue setup signal including information regarding a queue corresponding to transmission of a plurality of bands by using the band A (the same as above). The AP 101 and the STA 102 may transmit and receive the MBO queue setup signal by using the band B instead of the band A.

Figure 15:
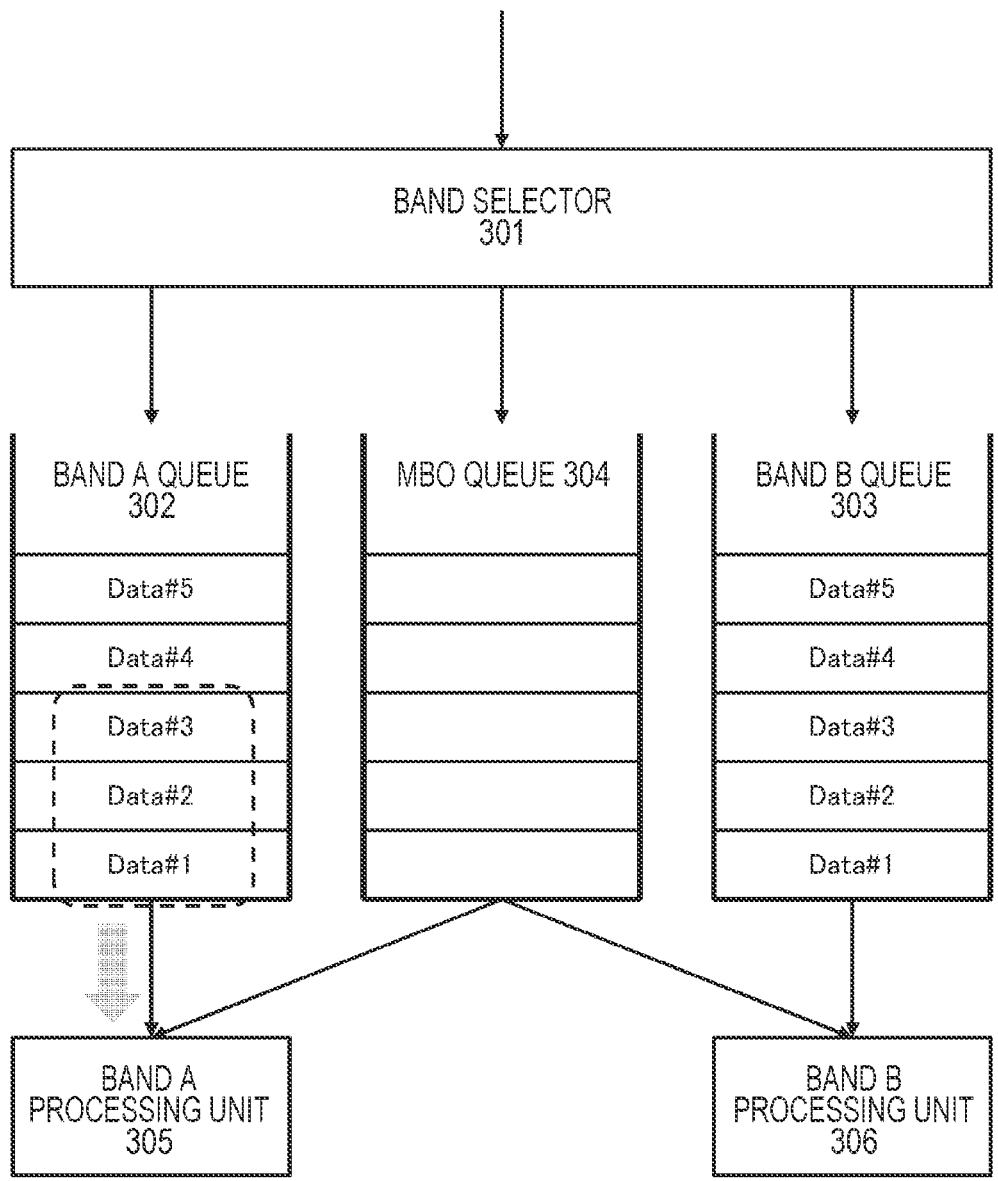
FIG. 15 is a diagram illustrating an operation example of a queue in a case where the data communication illustrated in FIG. 14 is performed.

Then, when acquiring the transmission right in the band A, the AP 101 transmits a first data signal including data addressed to the STA 102 in the band A at time T1401. FIG. 15 illustrates an operation example of the queue on the AP 101 side at time T1401. At this time T1401, the AP 101 sequentially extracts data #1, data #2, and data #3 assigned with the identifiers indicating the order from the band A queue 302, and performs transfer to the band A processing unit 305, thereby transmitting the first data signal.

Furthermore, when acquiring the transmission right in the band B independently of the transmission of the first data signal in the band A, the AP 101 transmits a second data signal including the data addressed to the STA 102 in the band B at time T1402. For example, when the AP 101 independently sets a backoff time in each of the band A and the band B and starts the backoff, as illustrated in FIG. 14, it is assumed that a timing at which the first data signal is transmitted in the band A and a timing at which the second data signal is transmitted in the band B have a time difference.

Figure 16:
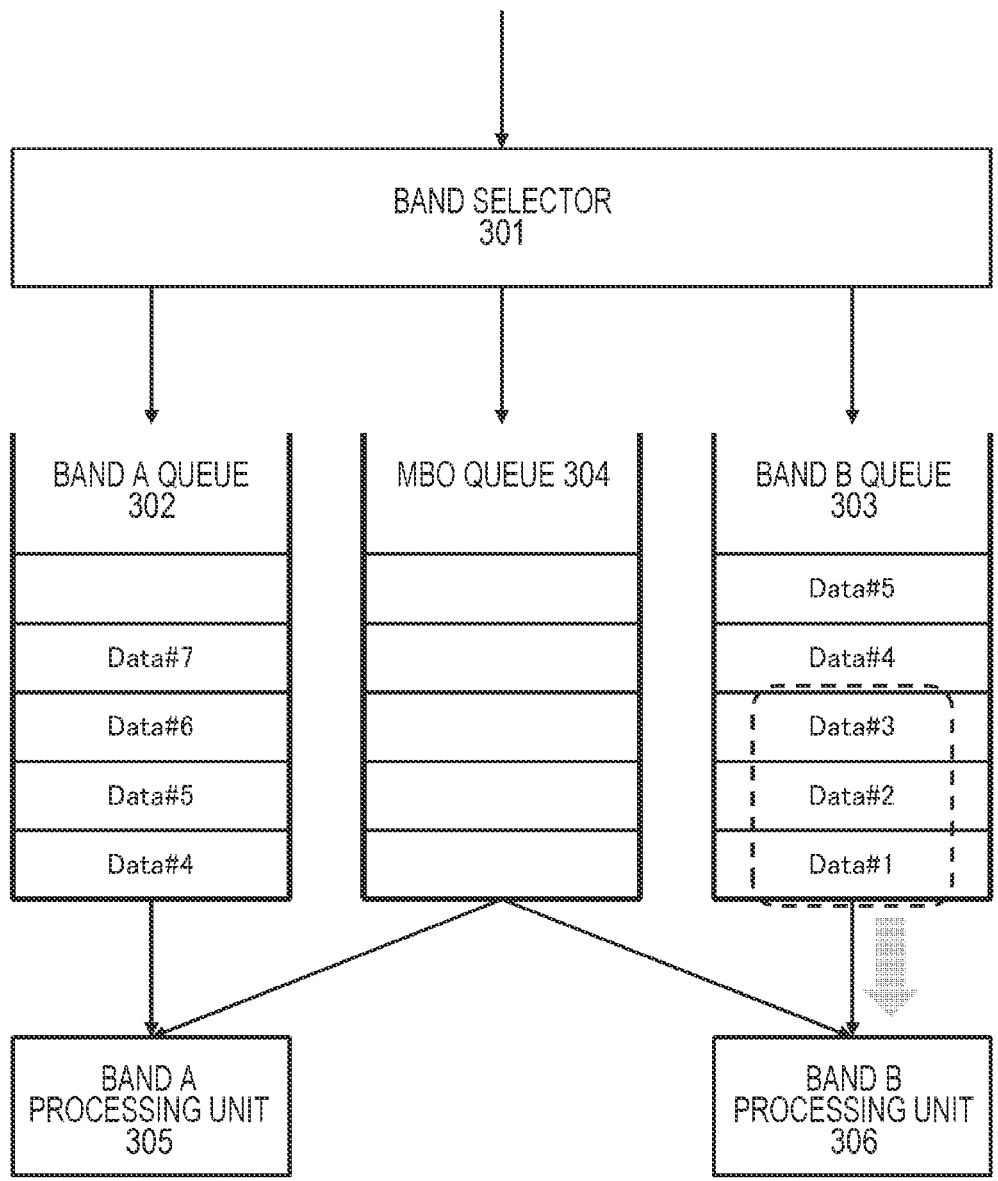
FIG. 16 is a diagram illustrating the operation example of the queue in a case where the data communication illustrated in FIG. 14 is performed.

FIG. 16 illustrates an operation example of the queue on the AP 101 side at time T1402. At this time T1402, the AP 101 sequentially extracts data #1, data #2, and data #3 assigned with the identifiers indicating the order from the band B queue 303, and performs transfer to the band B processing unit 306, thereby transmitting the second data signal. Here, the identifier indicating the order of the data included in the second data signal transmitted in the band B is the same as the data included in the first data signal transmitted in the band A since the identifier indicating the order is independently assigned in each queue.

The STA 102 receives and demodulates the first data signal transmitted from the AP 101 in the band A, thereby acquiring data addressed to the STA itself. Thereafter, the STA 102 transmits a first BA signal including the reception result of the first data signal to the AP 101 in the band A. In the example illustrated in FIG. 14, the STA 102 notifies the AP 101 of the first BA signal indicating the failure in the demodulation of the data assigned with #3 as the identifier indicating the order in the band A. The STA transmits the BA signal using, for example, a band designated by the MBO queue setup signal.

Figure 17:
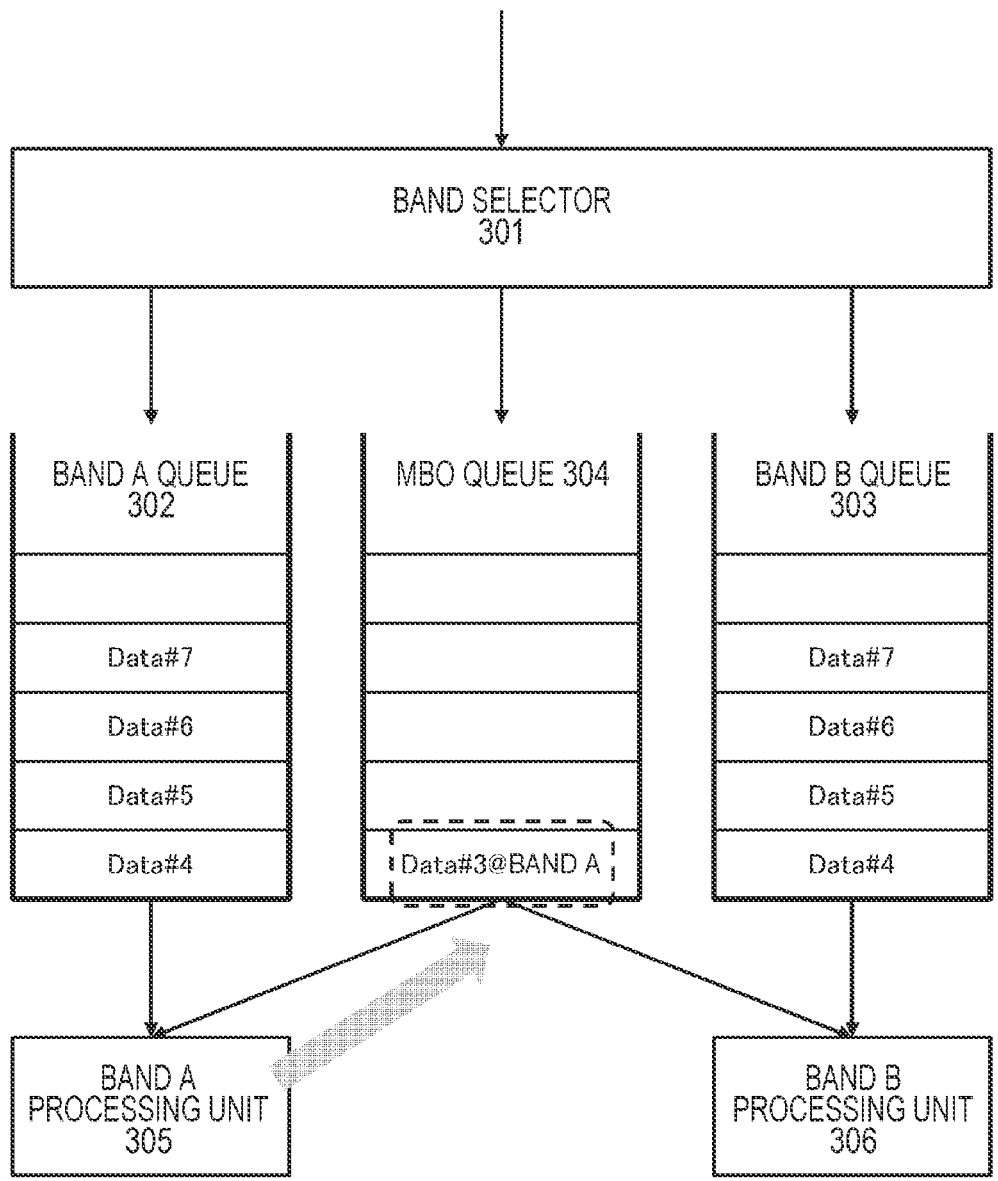
FIG. 17 is a diagram illustrating the operation example of the queue in a case where the data communication illustrated in FIG. 14 is performed.

When receiving the first BA signal returned from the STA 102 in the band A, the AP 101 determines data to be retransmitted on the basis of the reception result included in the first BA signal. In the example illustrated in FIG. 14, the AP 101 determines retransmission of the data assigned with #3 as the identifier indicating the order and transmitted in the band A at time T1403. Then, at time T1403, the AP 101 stores data #3 determined to perform retransmission in the MBO queue 304. When the retransmission data is stored in the MBO queue 304, the retransmission data is stored together with information indicating the band in which each piece of data is first transmitted. FIG. 17 illustrates an operation example of the queue on the AP 101 side at time T1403.

Furthermore, the STA 102 receives and demodulates the second data signal transmitted from the AP 101 in the band B, thereby acquiring data addressed to the STA itself. Thereafter, the STA 102 transmits a second BA signal including the reception result of the second data signal to the AP 101 in the band B. In the example illustrated in FIG. 14, the STA 102 notifies the AP 101 of the second BA signal indicating the failure in the demodulation of the data assigned with #2 as the identifier indicating the order in the band A. The STA transmits the BA signal using, for example, a band designated by the MBO queue setup signal.

Figure 18:
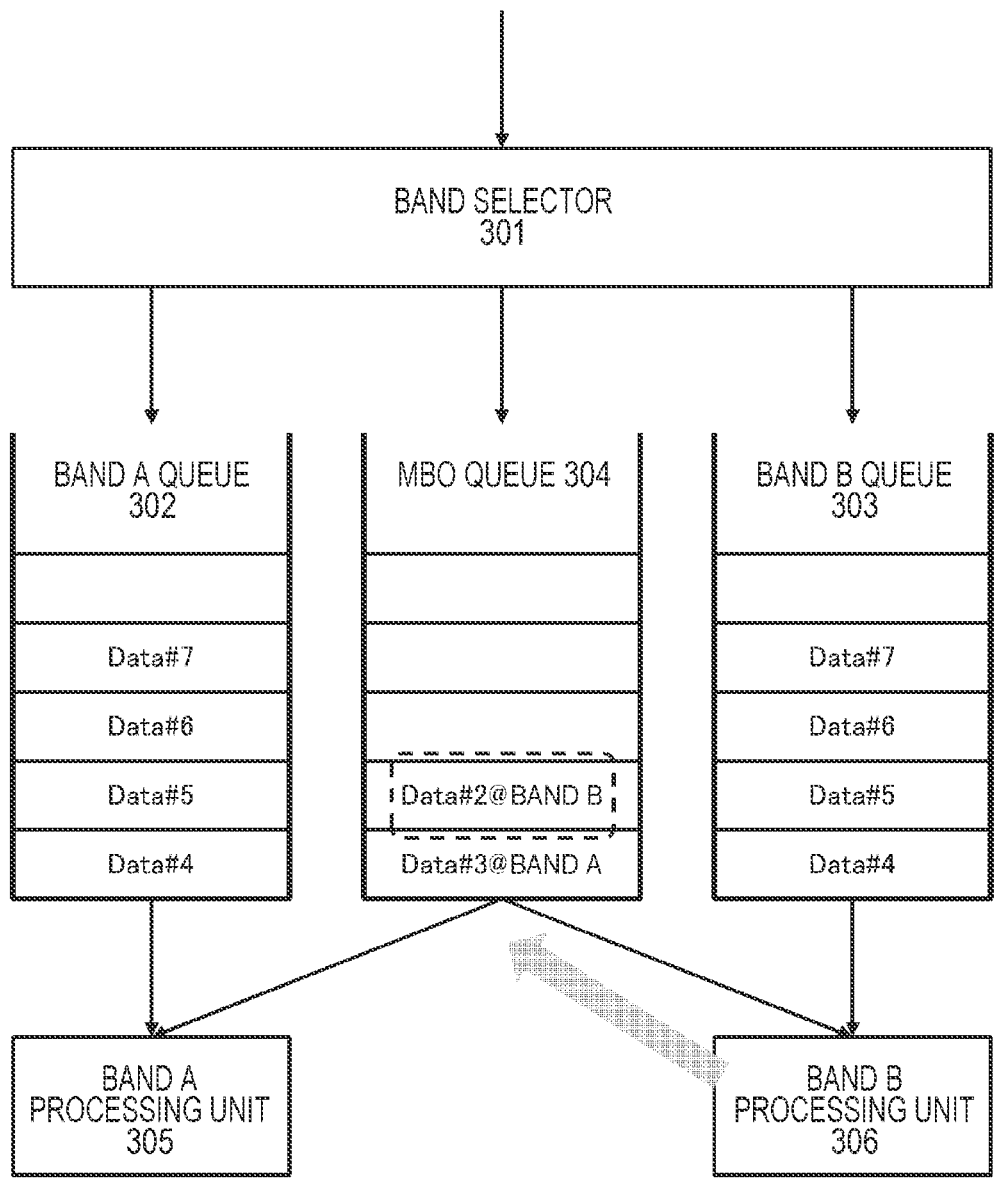
FIG. 18 is a diagram illustrating the operation example of the queue in a case where the data communication illustrated in FIG. 14 is performed.

When receiving the second BA signal returned from the STA 102 in the band B, the AP 101 determines data to be retransmitted on the basis of the reception result included in the second BA signal. In the example illustrated in FIG. 14, the AP 101 determines retransmission of the data assigned with #2 as the identifier indicating the order and transmitted in the band B at time T1404. Then, at time T1404, the AP 101 stores data #2 determined to perform retransmission in the MBO queue 304. When the retransmission data is stored in the MBO queue 304, the retransmission data is stored together with information indicating the band in which each piece of data is first transmitted. FIG. 18 illustrates an operation example of the queue on the AP 101 side at time T1404.

Figure 19:
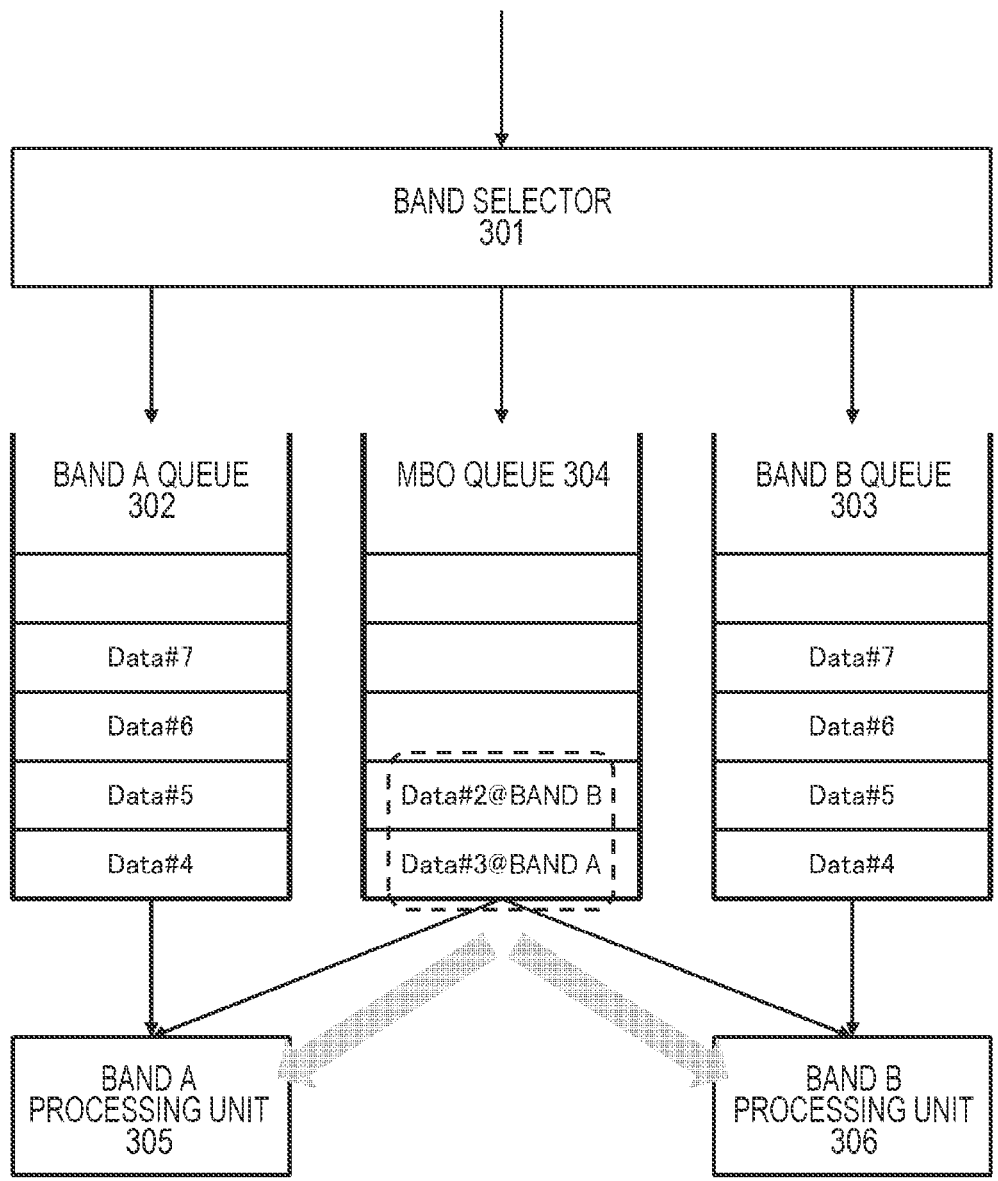
FIG. 19 is a diagram illustrating the operation example of the queue in a case where the data communication illustrated in FIG. 14 is performed.

After determining the data to be retransmitted, when acquiring the transmission rights in the band A and the band B at time T1405, the AP 101 transmits a third data signal including the above-described data to be retransmitted in at least one of the band A or the band B (In the example illustrated in FIG. 14, the third data signal is transmitted in both the band A and the band B). At this time T1405, the AP 101 extracts data #3@band A from the MBO queue 304 and performs transfer to the band A processing unit 305, or extracts data #2@band B and performs transfer to the band B processing unit 306, thereby transmitting the third data signal. FIG. 19 illustrates an operation example of the queue on the AP 101 side at time T1405.

The data signal to be transmitted includes information regarding a band in which the stored data is first transmitted. Furthermore, the data signal may include information regarding the amount of data stored in the MBO queue 304. The information regarding the amount of data may be, for example, information regarding all the amounts of data stored in the MBO queue 304. Alternatively, in a case where the MBO queue 404 illustrated in FIG. 4 or the MBO queue 504 illustrated in FIG. 5 is configured by a plurality of sub-queues, the information regarding the amount of data may be information regarding the amount of data stored in the sub-queue corresponding to the access category of the retransmission data.

When normally receiving the third data signal from the AP 101 in the band A or the band B, from the identifier indicating the order and the information indicating the band of the first transmission, the STA 102 associates the data first received in the band A with the retransmission data in the band A and the band B, correctly rearranges the order, and performs transfer to the upper layer.

In a case where the received data signal includes the information regarding the amount of data stored in the MBO queue 304, the STA 102 may, for example, reduce other processing loads for the retransmission processing or prioritize the transmission of the AP 101 by predicting the amount of data to be retransmitted from the AP 101 in the future, for example, and suppressing the amount of transmission data to be transmitted from itself. When the STA 102 side performs transmission and consumes communication resources, the number of communication resources available on the AP 101 side having data to be preferentially transmitted decreases, and transmission is not possible. However, the STA 102 suppresses the amount of transmission data, so that such a problem can be reduced.

According to the communication sequence illustrated in FIG. 14, the AP 101 as a data transmission source can ensure redundancy by retransmitting the same data in a plurality of bands. Furthermore, the AP 101 improves a success rate of retransmission and improves reliability. Furthermore, the AP 101 can suppress an increase in delay due to a plurality of times of occurrences of retransmission. Furthermore, the AP 101 can improve a system throughput by reducing a plurality of times of retransmission.

Note that, in the example of the communication sequence example illustrated in FIG. 14, the AP 101 is on the data transmission side, and the STA 102 is on the data reception side. However, it is necessarily understood that this also holds true even when the AP 101 is switched to the data reception side, and the STA 102 is switched to the data transmission side.

Figure 20:
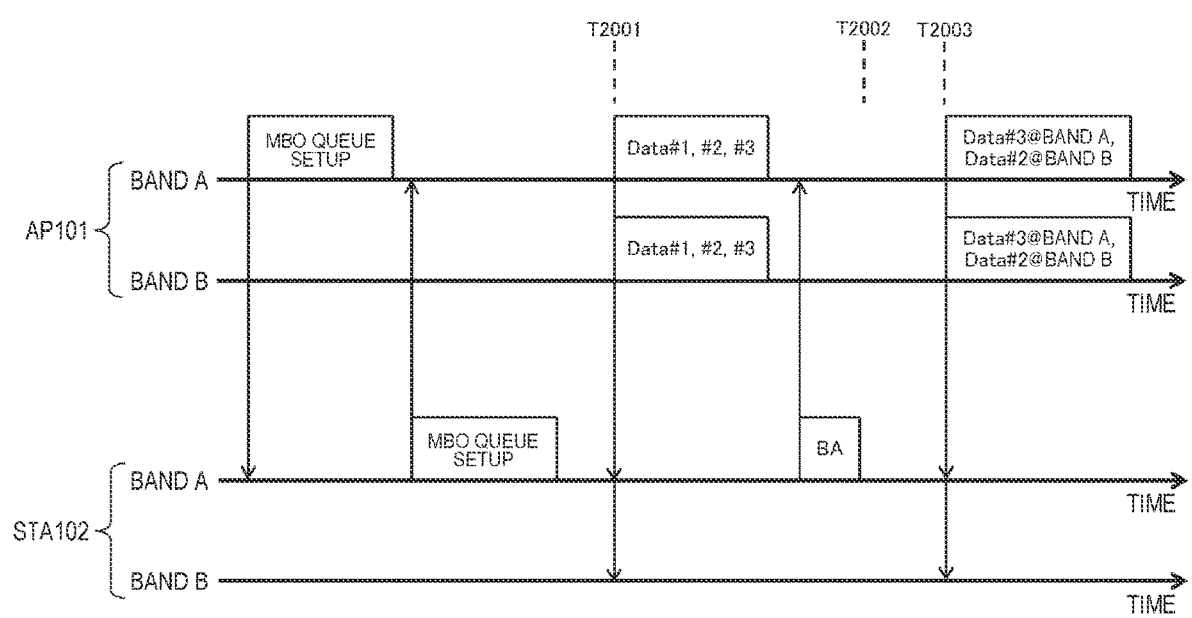
FIG. 20 is a diagram illustrating still another communication sequence example in a case where data communication is performed between the AP 101 and the STA 102 using the band A and the band B.
Figure 21:
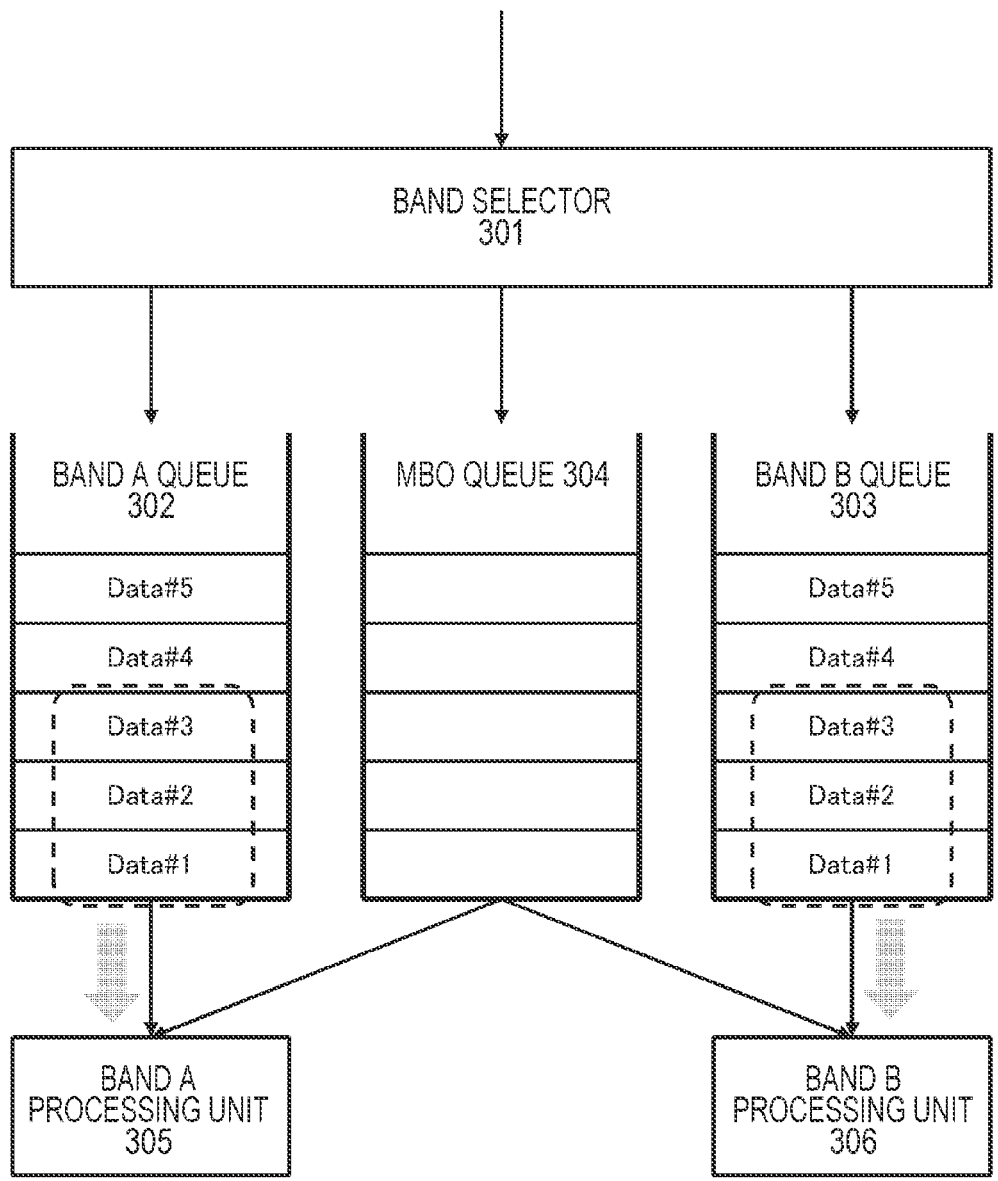
FIG. 21 is a diagram illustrating an operation example of a queue in a case where the data communication illustrated in FIG. 20 is performed.
Figure 22:
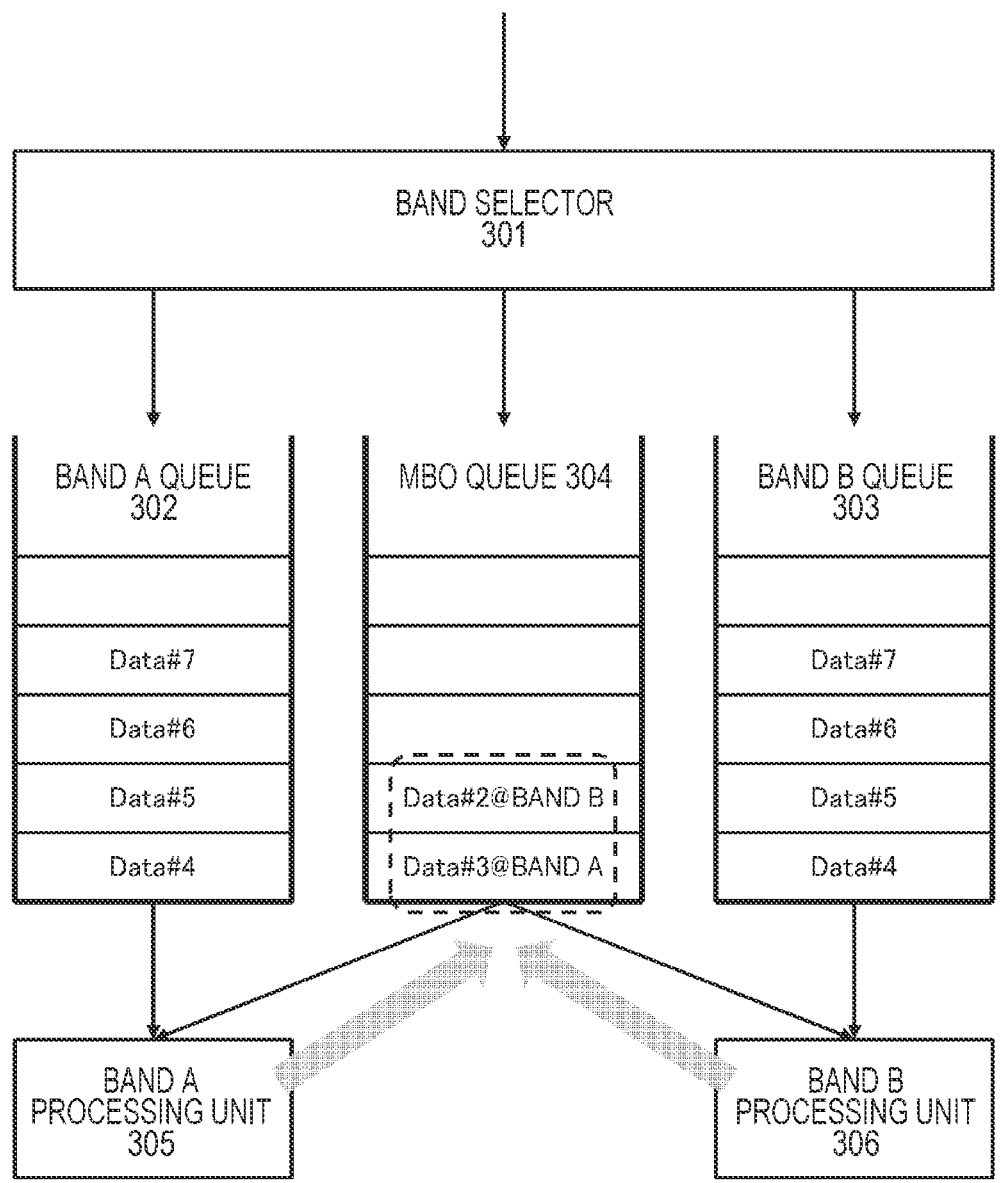
FIG. 22 is a diagram illustrating the operation example of the queue in a case where the data communication illustrated in FIG. 20 is performed.
Figure 23:
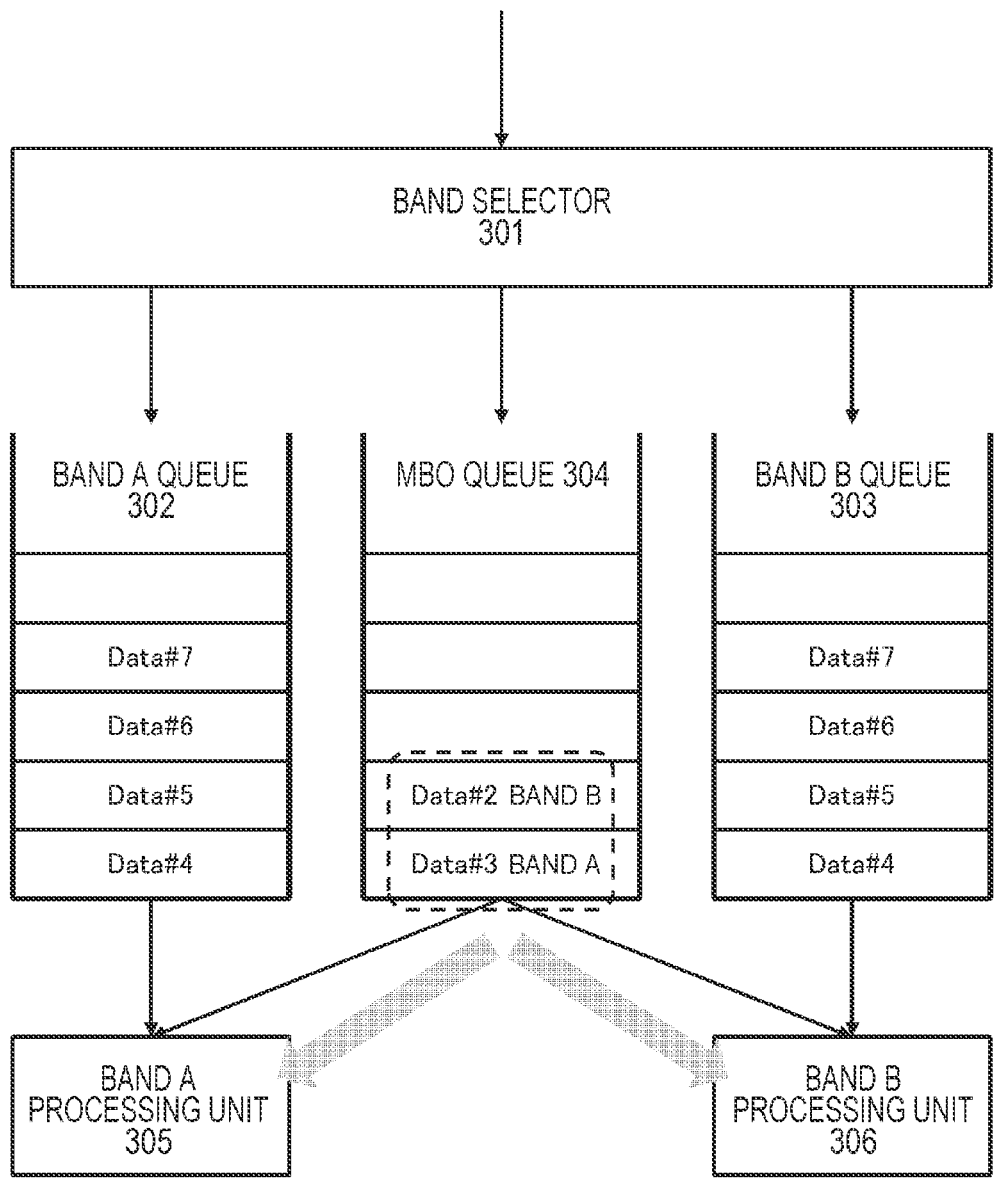
FIG. 23 is a diagram illustrating the operation example of the queue in a case where the data communication illustrated in FIG. 20 is performed.

FIG. 20 illustrates still another communication sequence example in a case where data communication is performed between the AP 101 and the STA 102 using the band A and the band B in the communication system 100 illustrated in FIG. 1. However, a horizontal axis is a time axis, and an operation example for each time in each band of the band A and the band B of the AP 101 and an operation example for each time in each band of the band A and the band B of the STA 102 are illustrated. Furthermore, FIGS. 21 to 23 illustrate an operation example of a queue in a case where the data communication illustrated in FIG. 20 is performed between the AP 101 and the STA 102 using the band A and the band B. Here, the queue and the sub-queue are not distinguished, and are simply referred to as "queue" (or it is assumed that the AP 101 uses the queue configuration illustrated in FIG. 3.).

In a case where at least one of the band A or the band B used in the data communication between the AP 101 and the STA 102 is a band permitted to be used by the database access, it is assumed that the use of the band is permitted by the database access in advance.

First, the AP 101 and the STA 102 transmit and receive, to/from each other, an MBO queue setup signal including information regarding a queue corresponding to transmission of a plurality of bands by using the band A (the same as above). The AP 101 and the STA 102 may transmit and receive the MBO queue setup signal by using the band B instead of the band A.

Then, when acquiring the transmission rights in the band A and the band B, the AP 101 transmits the first data signal including the data addressed to the STA 102 in the band A and transmits the second data signal including the data addressed to the STA 102 in the band B at time T2001. For example, when the AP 101 sets a common (for multi-band) backoff time between the band A and the band B and starts (for multi-band) backoff, as illustrated in FIG. 20, it is assumed that the first data signal and the second data signal are simultaneously transmitted in the band A and the band B.

FIG. 21 illustrates an operation example of the queue on the AP 101 side at time T2001. At this time T2001, the AP 101 sequentially extracts data #1, data #2, and data #3 assigned with the identifiers indicating the order from the band A queue 302, and performs transfer to the band A processing unit 305, thereby transmitting the first data signal. Furthermore, at this time T2001, the AP 101 sequentially extracts data #1, data #2, and data #3 assigned with the identifiers indicating the order from the band B queue 302, and performs transfer to the band B processing unit 306, thereby transmitting the second data signal. Here, the identifier indicating the order of the data included in the second data signal transmitted in the band B is the same as the data included in the first data signal transmitted in the band A since the identifier indicating the order is independently assigned in each queue.

The STA 102 receives and demodulates the first data signal transmitted from the AP 101 in the band A, and receives and demodulates the second data signal transmitted from the AP 101 in the band B, thereby acquiring data addressed to the STA itself. Thereafter, the STA 102 transmits the first BA signal including the reception result of the first data signal to the AP in the band A, and transmits the second BA signal including the reception result of the second data signal to the AP 101 in the band B. Alternatively, the STA 102 transmits, to the AP 101, a third BA signal including the reception results of both the first data signal and the second data signal and the band in which the data included in each data signal is first transmitted, instead of the first BA signal and the second BA signal, in at least one of the band A or the band B. The STA transmits the BA signal using, for example, a band designated by the MBO queue setup signal.

In the example illustrated in FIG. 20, the STA 102 notifies the AP 101 of the third BA signal indicating both the failure in demodulation of the data assigned with #3 as the identifier indicating the order as the reception result of the first data signal and the failure in demodulation of the data assigned with #2 as the identifier indicating the order as the reception result of the second data signal in the band A.

When receiving the third BA signal returned from the STA 102 in the band A, the AP 101 determines data to be retransmitted on the basis of the reception result included in the third BA signal. In the example illustrated in FIG. 20, the AP 101 determines retransmission of the data which is assigned with #3 as the identifier indicating the order and transmitted in the band A and the data which is assigned with #2 as the identifier indicating the order and transmitted in the band B at time T2002. Then, at the time T2002, the AP 101 stores each piece of data determined to be retransmitted in the MBO queue 304 together with information indicating the band of the first transmission. FIG. 22 illustrates an operation example of the queue on the AP 101 side at time T2002. Data #3@Band A and data #2@Band B are stored in the MBO queue 304.

After determining the data to be retransmitted, when acquiring the transmission rights in the band A and the band B at time T2003, the AP 101 transmits a third data signal including the above-described data to be retransmitted in at least one of the band A or the band B (In the example illustrated in FIG. 20, the third data signal is transmitted in both the band A and the band B). At this time T2003, the AP 101 extracts data #3@band A from the MBO queue 304 and performs transfer to the band A processing unit 305, or extracts data #2@band B and performs transfer to the band B processing unit 306, thereby transmitting the third data signal. FIG. 23 illustrates an operation example of the queue on the AP 101 side at time T2003.

The data signal to be transmitted includes information regarding a band in which the stored data is first transmitted. Furthermore, the data signal may include information regarding the amount of data stored in the MBO queue 304. The information regarding the amount of data may be, for example, information regarding all the amounts of data stored in the MBO queue 304. Alternatively, in a case where the MBO queue 404 illustrated in FIG. 4 or the MBO queue 504 illustrated in FIG. 5 is configured by a plurality of sub-queues, the information regarding the amount of data may be information regarding the amount of data stored in the sub-queue corresponding to the access category of the retransmission data.

When normally receiving the third data signal from the AP 101 in the band A or the band B, from the identifier indicating the order and the information indicating the band of the first transmission, the STA 102 associates the data first received in the band A with the retransmission data in the band A and the band B, correctly rearranges the order, and performs transfer to the upper layer.

In a case where the received data signal includes the information regarding the amount of data stored in the MBO queue 304, the STA 102 may, for example, reduce other processing loads for the retransmission processing or prioritize the transmission of the AP 101 by predicting the amount of data to be retransmitted from the AP 101 in the future, for example, and suppressing the amount of transmission data to be transmitted from itself. When the STA 102 side performs transmission and consumes communication resources, the number of communication resources available on the AP 101 side having data to be preferentially transmitted decreases, and transmission is not possible. However, the STA 102 suppresses the amount of transmission data, so that such a problem can be reduced.

According to the communication sequence illustrated in FIG. 20, the AP 101 as a data transmission source can ensure redundancy by retransmitting the same data in a plurality of bands. Furthermore, the AP 101 improves a success rate of retransmission and improves reliability. Furthermore, the AP 101 can suppress an increase in delay due to a plurality of times of occurrences of retransmission. Furthermore, the AP 101 can improve a system throughput by reducing a plurality of times of retransmission.

Note that, in the example of the communication sequence example illustrated in FIG. 20, the AP 101 is on the data transmission side, and the STA 102 is on the data reception side. However, it is necessarily understood that this also holds true even when the AP 101 is switched to the data reception side, and the STA 102 is switched to the data transmission side.

Figure 24:
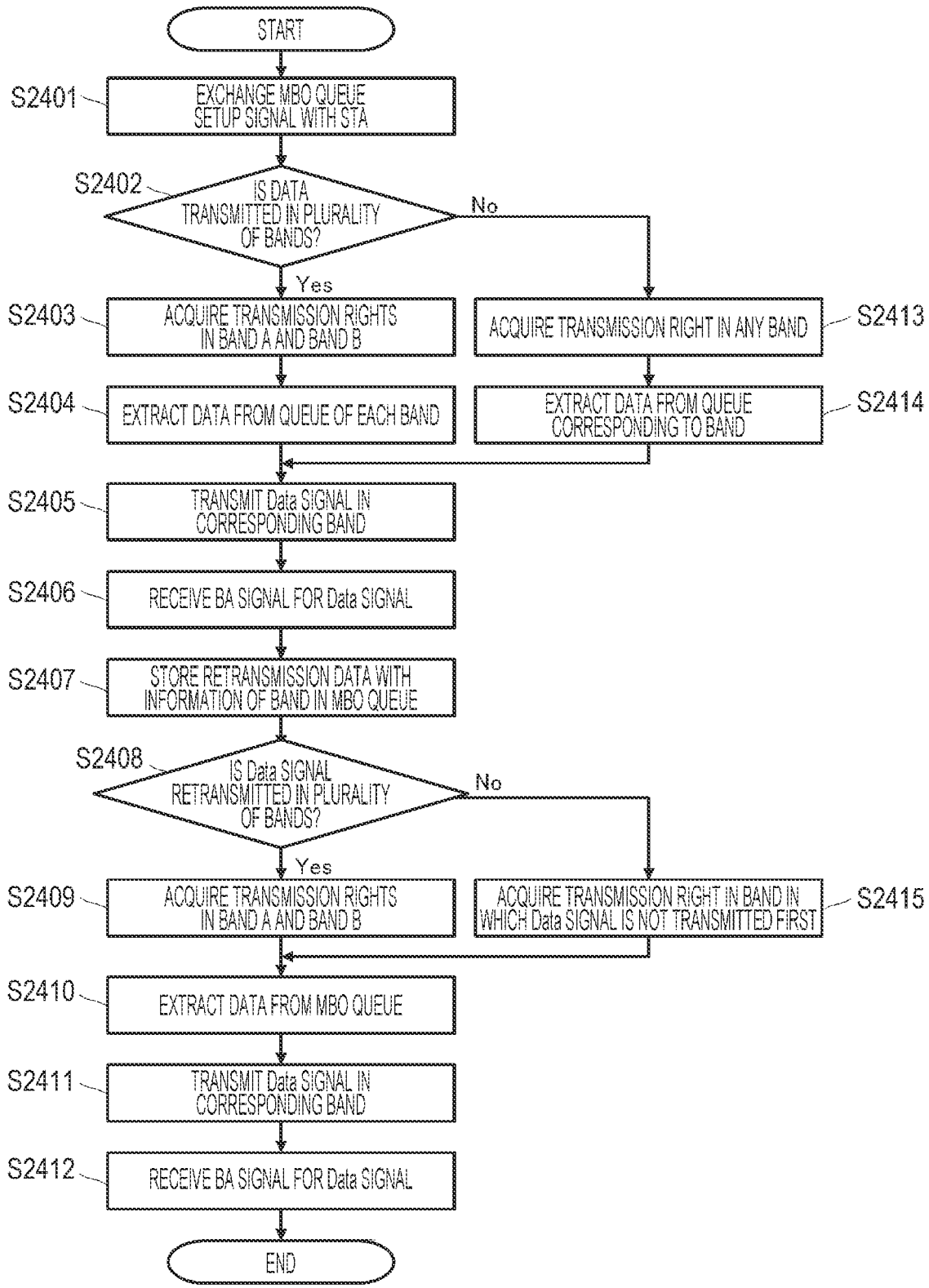
FIG. 24 is a flowchart illustrating a processing procedure executed by an AP.

FIG. 24 illustrates a processing procedure executed by the AP to realize the communication sequence illustrated in FIGS. 6, 10, 14, and 20 in the form of a flowchart. The illustrated processing procedure is assumed to be executed by the communication device 200 having the device configuration illustrated in FIG. 2 as the AP. Furthermore, here, it is assumed that communication can be performed between an AP and an STA using two bands of band A and band B.

The AP transmits an MBO queue setup signal to the subordinate STA and receives the MBO queue setup signal from the subordinate STA (step S2401).

Then, the AP determines whether to transmit a data signal to the STA by using both the band A and the band B on the basis of the MBO queue setup signal exchanged with the STA (step S2402).

Here, in a case where it is determined that the data signal is transmitted to the STA using both the bands of the band A and the band B (Yes in step S2402), when acquiring transmission rights in both the band A and the band B (step S2403), the AP extracts data from each of the band A queue 302 and the band B queue 303 (step S2404).

On the other hand, in a case where it is determined not to transmit the data signal to the STA using both the bands of the band A and the band B (No in step S2402), when acquiring the transmission right in either the band A or the band B (step S2413), the AP extracts data from the queue corresponding to the band in which the transmission right is acquired (step S2414).

Then, the AP transmits the data signal to the STA using both the bands of the band A and the band B or using any one of the bands in which the transmission right is acquired (step S2405).

Thereafter, when receiving a BA signal for the transmitted data signal from the STA (step S2406), the AP determines data to be retransmitted and stores the data in the MBO queue 304 together with information indicating the band in which the data is first transmitted (step S2407).

Next, the AP determines whether to retransmit the data signal to the STA using both bands of the band A and the band B (step S2408).

Here, in a case where it is determined that the data signal is retransmitted to the STA using both the bands of the band A and the band B (Yes in step S2408), the AP acquires the transmission rights in both the band A and the band B (step S2409). Furthermore, in a case where it is determined not to retransmit the data signal to the STA using both the bands of the band A and the band B (No in step S2408), the AP acquires a transmission right in a band other than the band in which the data signal to be retransmitted is first transmitted (step S2415).

Next, the AP extracts data from the MBO queue 304 (step S2410), and retransmits the data signal to the STA in the band acquired in step S2409 or step S2415 (step S2411).

Thereafter, the AP receives the BA signal for the retransmitted data signal from the STA (step S2412), and ends this processing.

Figure 25:
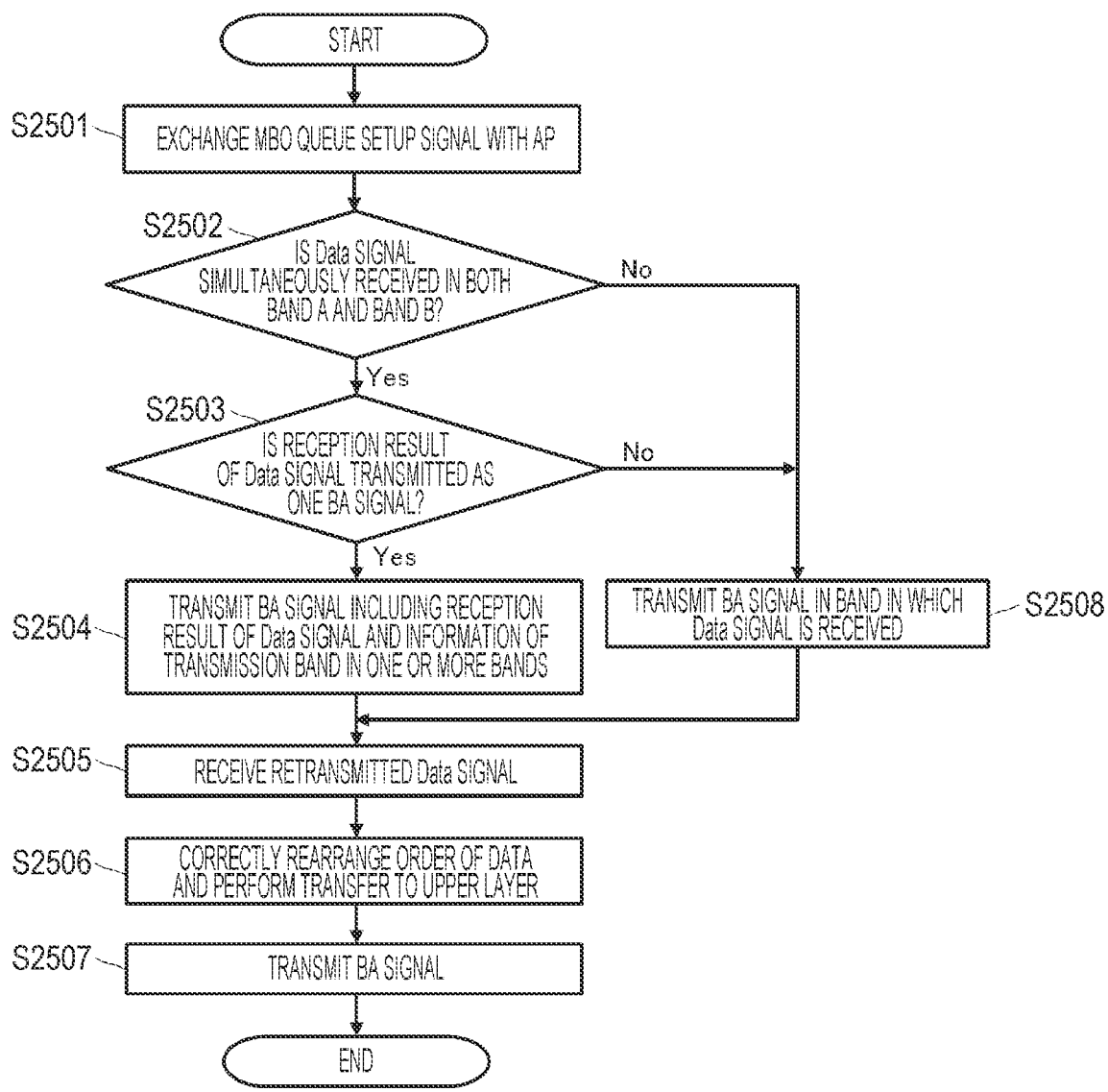
FIG. 25 is a flowchart illustrating a processing procedure executed by an STA.

FIG. 25 illustrates a processing procedure executed by the STA to realize the communication sequence illustrated in FIGS. 6, 10, 14, and 20 in the form of a flowchart. The illustrated processing procedure is assumed to be executed by the communication device 200 having the device configuration illustrated in FIG. 2 as the STA. Furthermore, here, it is assumed that communication can be performed between an AP and an STA using two bands of band A and band B.

The STA transmits an MBO queue setup signal to the connection destination AP and receives the MBO queue setup signal from the connection destination AP (step S2501).

The STA waits for reception of the data signal in one or both of the band A and the band B on the basis of the MBO queue setup signal exchanged with the AP. Then, the STA checks whether or not the data signal is simultaneously received from the AP in both the bands of the band A and the band B (step S2502).

Here, when the data signal from the AP is simultaneously received in both the bands of the band A and the band B (Yes in step S2502), the STA determines whether to transmit the reception result of the data signal as one BA signal (step S2503).

Then, in a case where it is determined that the reception result of the data signal is transmitted as one BA signal (Yes in step S2503), the STA transmits the BA signal including the reception result of the data signal in each band and the information of the transmission band in one or more bands (step S2504).

On the other hand, in a case where the data signal from the AP is received in one of the band A and the band B (No in step S2502), or a case where it is determined that the reception result of the data signal is not transmitted as one BA signal (No in step S2503), the STA transmits the BA signal in the band in which the data signal is received (step S2508). In step S2508, the STA transmits the BA signal using, for example, a band designated by Band For BA Info (described later) in the MBO queue setup signal.

Thereafter, when normally receiving the data signal retransmitted from the AP (step S2505), from the identifier indicating the order and the information indicating the band of the first transmission which are added to each piece of received data, the STA associates the first received data with the retransmission data, correctly rearranges the order, and performs transfer to the upper layer (step S2506).

Then, the STA transmits the BA signal for the retransmitted data signal to the AP (step S2507), and ends this processing.

FIG. 26 illustrates an example of a frame format in which the MBO queue setup signal is stored.

The queue constitution indicated by reference numeral 2601 includes information regarding queue configurations corresponding to the AP and the STA. The information regarding the queue configuration includes information regarding the presence or absence of the MBO queue, the data type (or the access category) corresponding to the MBO queue, and the amount of data which can be held by the MBO queue. The information regarding the queue configuration includes information regarding the number of queues corresponding to respective bands and the amount of data which can be held.

Band For ReTX Info indicated by reference numeral 2602 includes information regarding a band in which data is retransmitted.

Band For TX Info indicated by reference numeral 2603 includes information regarding a band in which data is transmitted.

Band For BA Info indicated by reference numeral 2604 includes information regarding a band in which a notification of a reception result is performed.

TID_INFO indicated by reference numeral 2605 includes information regarding an identifier indicating a type of data to be transmitted and received.

Sequence Number Info indicated by reference numeral 2606 includes information regarding an identifier indicating an order of data to be transmitted and received.

Data Priority Info indicated by reference numeral 2607 includes information regarding an identifier indicating priority of data to be transmitted and received.

Retry Limit indicated by reference numeral 2608 includes the upper limit number of times of retransmission of data to be transmitted and received.

Life Time indicated by reference numeral 2609 includes information regarding a time until data to be transmitted and received is discarded.

Note that, in a case where at least one of the band A or the band B used in the data communication between the AP 101 and the STA 102 is a band permitted to be used by the database access, a band use permission flag indicating whether or not the use of the band is permitted by the database access in advance may be included in the frame.

Figure 27:
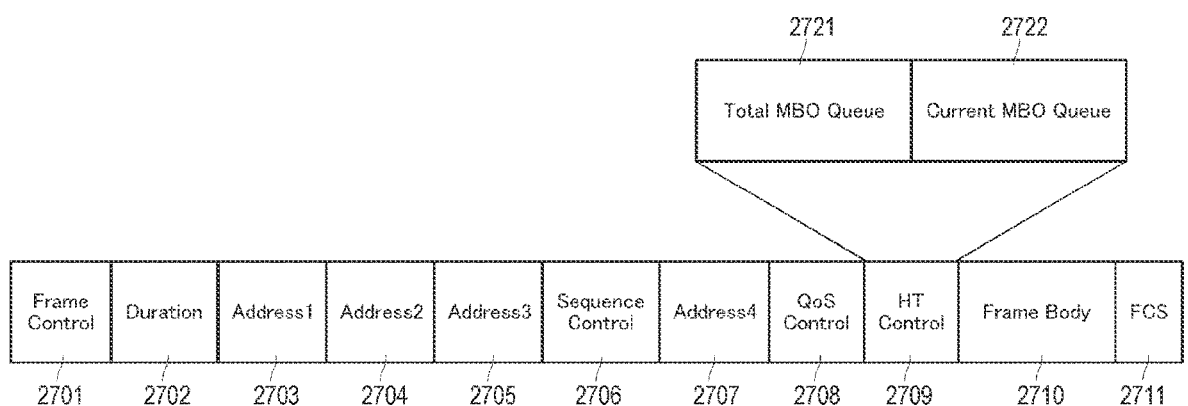
FIG. 27 is a diagram illustrating an example of a frame format used for transmission of a data signal.

FIG. 27 illustrates an example of a frame format used for transmission of a data signal. The illustrated frame basically follows a format of a general data frame in a wireless LAN system conforming to the IEEE 802.11 standard. Each field in an MAC header area indicated by reference numerals 2701 to 2708 is general, and thus detailed description thereof is not given herein.

The HT Control field indicated by reference numeral 2709 is defined in IEEE 802.11, and describes control information defined in a high-order standard intended for high throughput, for example. In this embodiment, the Total MBO Queue field indicated by reference numeral 2721 and the Current MBO Queue field indicated by reference numeral 2722 are included in the HT control field.

The Total MBO queue field 2721 stores information regarding all the amounts of data stored in the MBO queue. Furthermore, the Current MBO Queue field 2722 stores information regarding the amount of data stored in the sub-queue in the MBO queue corresponding to the data type (access category) of the retransmission data.

In the frame configuration illustrated in FIG. 27, the Total MBO Queue field 2721 and the Current MBO Queue field 2722 are included in the HT Control field 2709, but may also be included in the MAC header.

A data signal is stored in Frame Body indicated by reference numeral 2710. Then, in a last frame check sequence (FCS) field indicated by reference numeral 2711, a cyclic redundancy code (CRC) value calculated for the entire frame including the MAC header is described.

INDUSTRIAL APPLICABILITY

Hereinbefore, the technology disclosed in this specification has been described in detail with reference to specific embodiments. However, it is obvious that those skilled in the art can make modifications and substitutions of the embodiments without departing from the gist of the technology disclosed in this specification.

The technology disclosed in this specification can be applied to, for example, a communication system conforming to the IEEE 802.11 standard, but can also be applied to various types of multi-band communication systems conforming to other wireless standards.

Furthermore, in this specification, the embodiment to which the technology disclosed in this specification is applied in the data retransmission at the time of the downlink communication from a base station to a slave device has been mainly described. However, as a matter of course, the technology disclosed in this specification can be similarly applied even in a case where uplink communication from the slave device to the base station, sidelink communication between terminals, or the like is performed using a plurality of bands.

In short, the technology disclosed in this specification has been described in the form of exemplification, but the content described in this specification should not be interpreted in a limited manner. In order to determine the gist of the technology disclosed in this specification, the claims should be taken into consideration.

Note that the technology disclosed in this specification can have the following configurations.

REFERENCE SIGNS LIST (1) A communication device that transmits data in a plurality of bands, the device including:
a first queue for each band that stores data to be transmitted in each band;
a second queue common to at least two bands of the plurality of bands, the second queue storing data to be transmitted with high priority; and
a control unit that controls transmission of the data stored in the first queue and the second queue.

(2) The communication device according to claim 1, in which
the control unit controls transmission of information regarding the first queue and the second queue.

(2-1) The communication device according to (2) described above, in which
the control unit further controls reception of information regarding the first queue and the second queue from a data transmission destination.

(3) The communication device according to (1) or (2) described above, in which
each of the first queue and the second queue includes a plurality of sub-queues for respective data types.

(4) The communication device according to (3) described above, in which
the first queue and the second queue include different numbers of sub-queues.

(5) The communication device according to (3) or (4) described above, in which
a priority is assigned to each data type, and
the second queue includes sub-queues corresponding to some data types assigned with high priorities in the sub-queues included in the first queue.

(6) The communication device according to (2) described above, in which
the information regarding the first queue and the second queue includes information regarding a configuration of the second queue including at least one of information regarding presence or absence of the second queue, information regarding a data type corresponding to the second queue (or each sub-queue included in the second queue), or information regarding an amount of data which can be held by the second queue.

(6-1) The communication device according to (6) described above, in which
the information regarding the first queue and the second queue further includes at least one of information regarding a band in which data is retransmitted, information regarding a band in which data is transmitted, information regarding a band in which a notification of a reception result is performed, an identifier indicating a type of data to be transmitted and received, an identifier indicating an order of data to be transmitted, an identifier indicating a priority of data to be transmitted and received, an upper limit number of times of retransmission of data to be transmitted and received, or information regarding a time until data to be transmitted and received is discarded.

(7) The communication device according to any one of (1) to (6) described above, in which
data to be transmitted with high priority includes data requiring low delay and high reliability.

(8) The communication device according to any one of (1) to (7) described above, in which
data to be transmitted with high priority includes retransmission data.

(9) The communication device according to (8) described above, in which
the second queue stores the retransmission data together with information regarding a band of first transmission.

(10) The communication device according to (9) described above, in which
the control unit performs control to add the information regarding the band of first transmission to the retransmission data output from the second queue and transmits the retransmission data.

(11) The communication device according to (9) or (10) described above, in which
the control unit transmits the retransmission data output from the second queue by using a band determined on the basis of the band of first transmission.

(12) The communication device according to (11) described above, in which
the control unit simultaneously transmits the retransmission data output from the second queue in a plurality of bands.

(13) The communication device according to (11) described above, in which
the control unit simultaneously transmits the retransmission data output from the second queue in one or more bands including a band different from the band of first transmission.

(14) The communication device according to any one of (8) to (13) described above, in which
the control unit adds information regarding an amount of the data stored in the second queue to the retransmission data output from the second queue and transmits the retransmission data.

(15) The communication device according to (14) described above, in which
the information regarding the amount of the data stored in the second queue includes information regarding all the amounts of the data stored in the second queue.

(16) The communication device according to (14) or (15) described above, in which
the second queue includes a plurality of sub-queues for respective data types, and
the information regarding the amount of the data stored in the second queue includes information regarding an amount of data stored in a sub-queue in the second queue corresponding to a data type of the retransmission data.

(17) The communication device according to any one of (1) to (16) described above, in which
at least one of the plurality of bands is a band permitted to be used by database access.

(18) A communication method for transmitting data in a plurality of bands, the method including:
storing data to be transmitted in each band in a first queue for each band;
transmitting the data stored in the first queue;
storing data to be transmitted with high priority in a second queue common to at least two bands of the plurality of bands; and
transmitting the data stored in the second queue.

(19) A communication device that receives data in a plurality of bands, the device including:
an information reception unit that receives information regarding a first queue for each band and a second queue common to at least two bands of the plurality of bands; and
a data reception unit that receives data added with information indicating an order and information indicating a band of first transmission in at least one band of the plurality of bands.

(20) The communication device according to (19) described above, in which
the information reception unit receives, as the information regarding the first queue for each band and the second queue common to at least two bands of the plurality of bands, at least one of information regarding presence or absence of the second queue, information regarding a data type corresponding to the second queue (or each sub-queue included in the second queue), or information regarding an amount of data which can be held by the second queue.

(20-1) The communication device according to (20) described above, in which
the information regarding the first queue for each band and the second queue common to at least two of the plurality of bands, and the information regarding the first queue and the second queue further includes at least one of information regarding a band in which data is retransmitted, information regarding a band in which data is transmitted, information regarding a band in which a notification of a reception result is performed, an identifier indicating a type of data to be transmitted and received, an identifier indicating an order of data to be transmitted, an identifier indicating a priority of data to be transmitted and received, an upper limit number of times of retransmission of data to be transmitted and received, or information regarding a time until data to be transmitted and received is discarded.

(21) The communication device according to (19) or (20) described above, further including:
a data processing unit that rearranges each piece of the received data on the basis of the information indicating the order and the information indicating the band of first transmission.

(22) The communication device according to any one of (19) to (21) described above, further including:
a transmission unit that transmits a reception result of the data received in at least one band of the plurality of bands together with information regarding the transmission band.

(23) The communication device according to (22) described above, in which
the transmission unit transmits the reception result in a band designated by the information received by the information reception unit.

(24) The communication device according to any one of (19) to (23) described above, in which
the data reception unit receives the data further added with information regarding an amount of data stored in the second queue.

(25) The communication device according to (24) described above, in which
the information regarding the amount of the data stored in the second queue includes information regarding all the amounts of the data stored in the second queue.

(26) The communication device according to (24) or (25) described above, in which
the second queue includes a plurality of sub-queues for respective data types, and
the information regarding the amount of the data stored in the second queue includes information regarding an amount of data stored in a sub-queue in the second queue corresponding to a data type of the retransmission data.

(27) The communication device according to any one of (19) to (26) described above, in which
at least one of the plurality of bands is a band permitted to be used by database access.

(28) A communication method for receiving data in a plurality of bands, the method including:
receiving information regarding a first queue for each band and a second queue common to at least two bands of the plurality of bands; and
receiving data added with information indicating an order and information indicating a band of first transmission in at least one band of the plurality of bands.

200 Communication device
210 Control unit
220 Power supply unit
230 Communication unit
231 Wireless control unit
232 Data processing unit
233 Modulation/demodulation unit
234 Signal processing unit
235 Channel estimation unit
236 Wireless interface unit
237 Amplifier unit 238 Memory unit
240 Antenna unit
301 Band selector
302 Band A queue
303 Band B queue
304 MBO queue
305 Band A processing unit
306 Band B processing unit
401 Band selector
402 Band A queue
403 Band B queue
404 MBO queue
405 Band A processing unit
406 Band B processing unit
501 Band selector
502 Band A queue
503 Band B queue
504 MBO queue
505 Band A processing unit
506 Band B processing unit

The invention claimed is:

1. A communication device, comprising:
a first queue for each of a plurality of bands, wherein the first queue is configured to store first data for transmission in each band of the plurality of bands;
a second queue, common to at least two bands of the plurality of bands, wherein the second queue is configured to:
store second data that includes retransmission data, and
store the retransmission data together with information associated with a first band of a first transmission of the first data; and
a control unit configured to:
control the transmission of the first data in the each band of the plurality of bands,
control transmission of the second data with a second priority, wherein the second priority of the second data is higher than a first priority of the first data, and
control transmission of information associated with both the first queue and the second queue.

2. The communication device according to claim 1, wherein each of the first queue and the second queue includes a plurality of sub-queues for a plurality of specific data types.

3. The communication device according to claim 2, wherein
a specific priority is assigned to each data type of the plurality of specific data types,
the second queue includes a set of sub-queues of the plurality of sub-queues, wherein the set of sub-queues corresponds to a first set of data types of the plurality of specific data types,
the specific priority of each set of the first set of data types is higher than the specific priority of each set of a second set of data types included in the first queue, and
the plurality of specific data types includes the second set of data types.

4. The communication device according to claim 1, wherein the second data, for transmission with the second priority, requires low delay and high reliability with respect to the first data.

5. The communication device according to claim 1, wherein the control unit is further configured to:
output the retransmission data from the second queue;
add the information, associated with the first band of the first transmission, to the outputted retransmission data from the second queue; and
transmit the retransmission data to which the information associated with the first band is added.

6. The communication device according to claim 1, wherein the control unit is further configured to:
output the retransmission data from the second queue, and transmit the retransmission data, output from the second queue, based on the first band of the first transmission.

7. The communication device according to claim 6, wherein the control unit is further configured to simultaneously transmit the retransmission data, output from the second queue, in the plurality of bands.

8. The communication device according to claim 1, wherein the control unit is further configured to:
output the retransmission data from the second queue;
add information, associated with an amount of the second data, to the outputted retransmission data from the second queue; and
transmit the retransmission data to which the information associated with the amount of the second data is added.

9. The communication device according to claim 1, wherein at least one band of the plurality of bands is permitted for use by database access.

10. A communication method, comprising:
storing first data, for transmission in each of a plurality of bands, in a first queue for each band of the plurality of bands;
transmitting the stored first data in the each band of the plurality of bands;
storing second data
that includes retransmission data,
and
the second queue is common to at least two bands of the plurality of bands;
storing the retransmission data together with information associated with a first band of a first transmission of the first data;
transmitting the second data with a second priority, wherein the second priority of the second data is higher than a first priority of the first data; and
transmitting information associated with both the first queue and the second queue.

11. A communication device, comprising:
an information reception unit configured to receive information associated with:
a first queue for each of a plurality of bands, and
a second queue which is common to at least two bands of the plurality of bands; and
a data reception unit configured to receive, in at least one band of the plurality of bands, the data added with information which indicates an order of second data included in the second queue, and information which indicates a band of the plurality of bands for first transmission of first data included in the first queue.

12. The communication device according to claim 11, wherein
the information reception unit is further configured to receive, as the information associated with the first queue for each band and the second queue, at least one of information associated with at least one of:
one of a presence or an absence of the second queue,
a data type corresponding to one of the second queue or each sub-queue included in the second queue, or
an amount of the second data held by the second queue.

13. The communication device according to claim 11, further comprising a data processing unit configured to rearrange each piece of the received data based on the information which indicates the order of the second data, and the information which indicates the band for the first transmission of the first data.

14. The communication device according to claim 11, further comprising a transmission unit configured to transmit a reception result of the data received in at least one band of the plurality of bands together with the information associated with the band for the first transmission of the first data.

15. The communication device according to claim 11, wherein the data reception unit is further configured to receive the data added with information associated with an amount of the second data stored in the second queue.

16. The communication device according to claim 11, wherein the at least one band of the plurality of bands is permitted for use by database access.

17. A communication method, comprising:
   receiving information associated with:
      a first queue for each of a plurality of bands, and
      a second queue which is common to at least two bands of the plurality of bands; and
   receiving, in at least one band of the plurality of bands, data added with information which indicates an order of second data included in the second queue, and information which indicates a band of the plurality of bands for first transmission of first data included in the first queue.

18. A communication device, comprising:
   a first queue, for each of a plurality of bands, configured to store first data;
   a second queue, common to at least two bands of the plurality of bands, wherein the second queue is configured to store second data that
      includes retransmission data, and
      a second priority of the second data is higher than a first priority of the first data; and
   a control unit configured to:
      control a transmission of the first data in each band of the plurality of bands,
      control a transmission of the second data based on the second priority of the second data;
      output the retransmission data from the second queue;
      add information, associated with an amount of the second data, to the outputted retransmission data; and
      transmit the retransmission data to which the information, associated with the amount of the second data, is added.

* * * * *